United States Patent
Boyles

(10) Patent No.: US 11,617,426 B2
(45) Date of Patent: *Apr. 4, 2023

(54) COLLAPSIBLE HARD CASE FOR SURFBOARDS AND OTHER LARGE OBJECTS

(71) Applicant: David A. Boyles, El Segundo, CA (US)

(72) Inventor: David A. Boyles, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,273

(22) Filed: Oct. 21, 2021

(65) Prior Publication Data

US 2022/0039528 A1 Feb. 10, 2022

Related U.S. Application Data

(63) Continuation of application No. 15/865,910, filed on Jan. 9, 2018, now Pat. No. 11,154,124, which is a
(Continued)

(51) Int. Cl.
*A45C 11/00* (2006.01)
*A63C 11/02* (2006.01)
(Continued)

(52) U.S. Cl.
CPC ............... *A45C 11/00* (2013.01); *A45C 5/14* (2013.01); *A63B 71/0036* (2013.01);
(Continued)

(58) Field of Classification Search
CPC ............ B63B 35/7946; A63B 71/0036; A63C 11/026; A45C 11/00; A45C 13/002;
(Continued)

(56) References Cited

U.S. PATENT DOCUMENTS

| 748,078 A | 12/1903 | Kaisling |
| 872,712 A | 12/1907 | Church |

(Continued)

FOREIGN PATENT DOCUMENTS

| GB | 2154654 A | 9/1985 |

OTHER PUBLICATIONS

U.S. Appl. No. 61/137,560, filed Jul. 31, 2008, Spec & Drawings.

*Primary Examiner* — Don M Anderson
*Assistant Examiner* — Jennifer Castriotta
(74) *Attorney, Agent, or Firm* — Neo IP

(57) ABSTRACT

A protective case for large objects including a lock housing formed from a first section and a second section, both of the sections including at least one external subsection and at least one internal subsection configured to telescope inside the external subsection; and an extension lock comprising a lock housing and a compression lock, the lock housing including a screw-threaded channel, and the compression comprising at least one screw-threaded shaft with a compressive component on the interior end and a lock handle on the exterior end, the screw-threaded shaft configured to matingly engage with the screw-threaded channel of the lock housing; the compression lock configured to descend in the lock housing and compressingly lock the internal subsection in an extended position upon locking rotation of the compression lock; and the compression lock configure to ascend in the lock housing upon unlocking rotation of the cam latch.

19 Claims, 36 Drawing Sheets

Related U.S. Application Data continuation-in-part of application No. 14/684,734, filed on Apr. 13, 2015, now abandoned, which is a continuation-in-part of application No. 14/195,501, filed on Mar. 3, 2014, now Pat. No. 9,010,559, which is a continuation-in-part of application No. 13/748,356, filed on Jan. 23, 2013, now Pat. No. 8,668,104, which is a continuation of application No. 13/224,904, filed on Sep. 2, 2011, now Pat. No. 8,381,930, which is a continuation-in-part of application No. 12/462,216, filed on Jul. 31, 2009, now Pat. No. 8,066,138.

(60) Provisional application No. 61/137,560, filed on Jul. 31, 2008.

(51) Int. Cl.
| | | |
|---|---|---|
| *A63B 71/00* | (2006.01) | |
| *A45C 5/14* | (2006.01) | |
| *A63C 17/00* | (2006.01) | |
| *B63B 32/87* | (2020.01) | |
| *B63B 32/80* | (2020.01) | |
| G10G 7/00 | (2006.01) | |
| F41C 33/06 | (2006.01) | |
| A45C 5/03 | (2006.01) | |
| A01K 97/08 | (2006.01) | |
| A45F 3/02 | (2006.01) | |
| A45C 13/30 | (2006.01) | |
| A45F 3/15 | (2006.01) | |
| A45F 3/04 | (2006.01) | |
| A63B 69/00 | (2006.01) | |
| A45C 7/00 | (2006.01) | |

(52) U.S. Cl.
CPC .......... *A63C 11/026* (2013.01); *A63C 17/002* (2013.01); *B63B 32/80* (2020.02); *B63B 32/87* (2020.02); *A01K 97/08* (2013.01); *A45C 7/0031* (2013.01); *A45C 13/30* (2013.01); *A45C 2005/037* (2013.01); *A45F 3/02* (2013.01); *A45F 3/04* (2013.01); *A45F 3/15* (2013.01); *A63B 69/0093* (2013.01); *A63B 2210/50* (2013.01); *A63C 2203/44* (2013.01); *F41C 33/06* (2013.01); *G10G 7/005* (2013.01)

(58) Field of Classification Search
CPC ... A45C 5/14; A45C 2005/037; A45C 7/0036; A45C 7/0031; B65D 11/00; B65D 11/1866; B65D 11/1873; B65D 11/188; B65D 11/1886; B65D 11/20; B65D 11/24; B65D 11/02; B65D 11/18; B65D 2581/051; B65D 2581/05; B65D 2581/02; B65D 2581/055; B65D 7/12
USPC ............ 206/315.1; 190/107; 220/4.24, 4.01, 220/4.26, 666, 692, 693
See application file for complete search history.

(56) References Cited

U.S. PATENT DOCUMENTS

| | | |
|---|---|---|
| 944,725 A | 12/1909 | Ferguson |
| 978,585 A | 12/1910 | Huber |
| 999,891 A | 8/1911 | Sheppard |
| 1,187,479 A | 6/1916 | Anderson |
| 1,213,599 A | 1/1917 | Dow |
| 2,045,083 A | 6/1936 | Illig |
| 2,230,393 A | 2/1941 | Thomson |
| 2,475,961 A | 7/1949 | Hilbert |
| 2,480,434 A | 8/1949 | Askin |
| 2,699,848 A | 1/1955 | Harry |
| 2,839,322 A | 6/1958 | Kirk |
| 3,006,443 A | 10/1961 | Siler |
| 3,479,076 A | 11/1969 | Schallehn |
| 3,480,311 A | 11/1969 | Lanham |
| 3,572,535 A | 3/1971 | Kinzie |
| 3,628,655 A | 12/1971 | Philip |
| 3,837,548 A | 9/1974 | Nerger |
| 4,494,783 A | 1/1985 | Poe |
| 4,643,302 A | 2/1987 | Baumgardner |
| 4,844,518 A | 7/1989 | Pritchard |
| 5,230,542 A | 7/1993 | Wiese |
| 6,502,871 B1 | 1/2003 | Malmanger |
| 6,626,017 B2 | 9/2003 | Herbeck et al. |
| 6,966,439 B2 | 11/2005 | Weleczki |
| 7,619,878 B1 | 11/2009 | Cook |
| 8,066,138 B2 | 11/2011 | Boyles |
| 8,381,930 B2 | 2/2013 | Boyles |
| 8,668,104 B2 | 3/2014 | Boyles |
| 9,010,559 B2 | 4/2015 | Boyles |
| 9,663,973 B2 | 5/2017 | Foster |
| 2002/0040858 A1 | 4/2002 | Fiore |
| 2002/0175164 A1 | 11/2002 | Dees et al. |
| 2004/0026281 A1 | 2/2004 | Boardman et al. |
| 2004/0232016 A1 | 11/2004 | Dietrich |
| 2005/0161955 A1 | 7/2005 | Hicok |
| 2006/0289584 A1 | 12/2006 | Lu |
| 2010/0147712 A1 | 6/2010 | Filho et al. |
| 2013/0043158 A1 | 2/2013 | Flood et al. |
| 2013/0098787 A1 | 4/2013 | Sung |
| 2014/0291976 A1 | 10/2014 | Ford et al. |
| 2015/0041463 A1 | 2/2015 | Liu et al. |
| 2015/0197320 A1 | 7/2015 | Ventura |
| 2015/0216277 A1 | 8/2015 | Boyles |
| 2018/0132584 A1 | 5/2018 | Boyles |
| 2019/0054985 A1 | 2/2019 | Bladd-Symms et al. |
| 2019/0289970 A1 | 9/2019 | McGuire et al. |

Section view A-A

FIG. 29
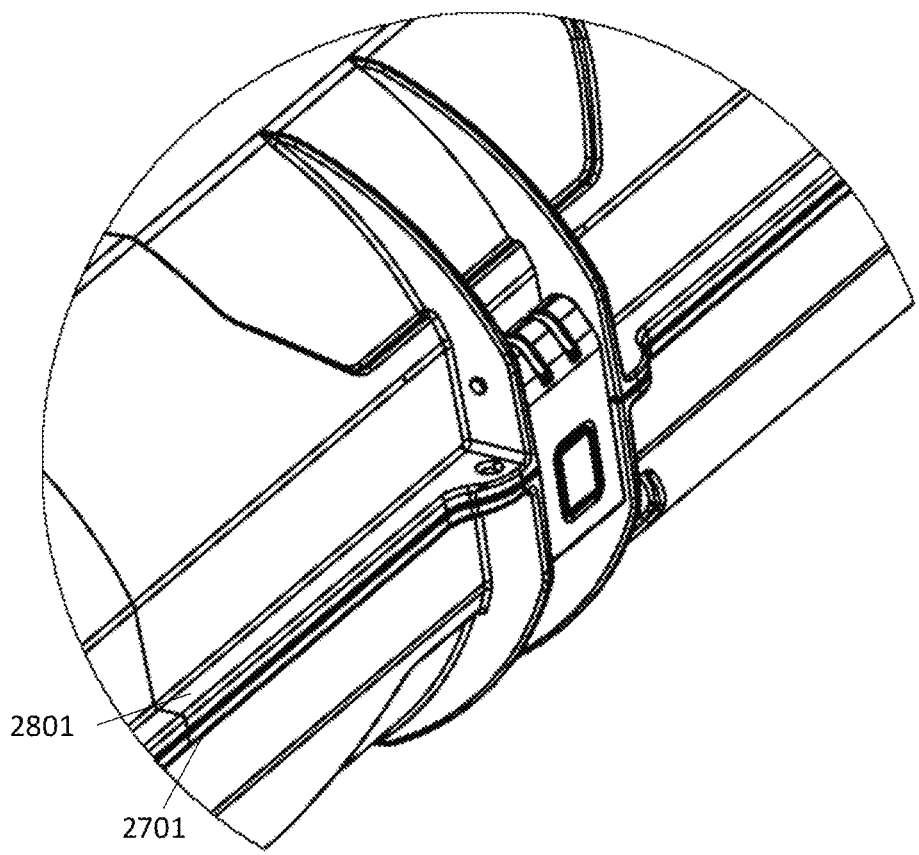
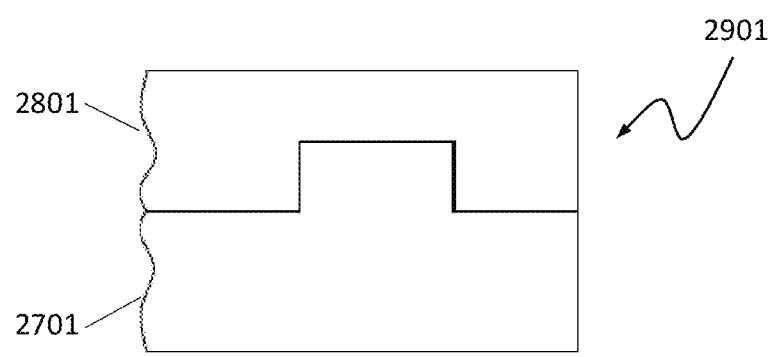

FIG. 32
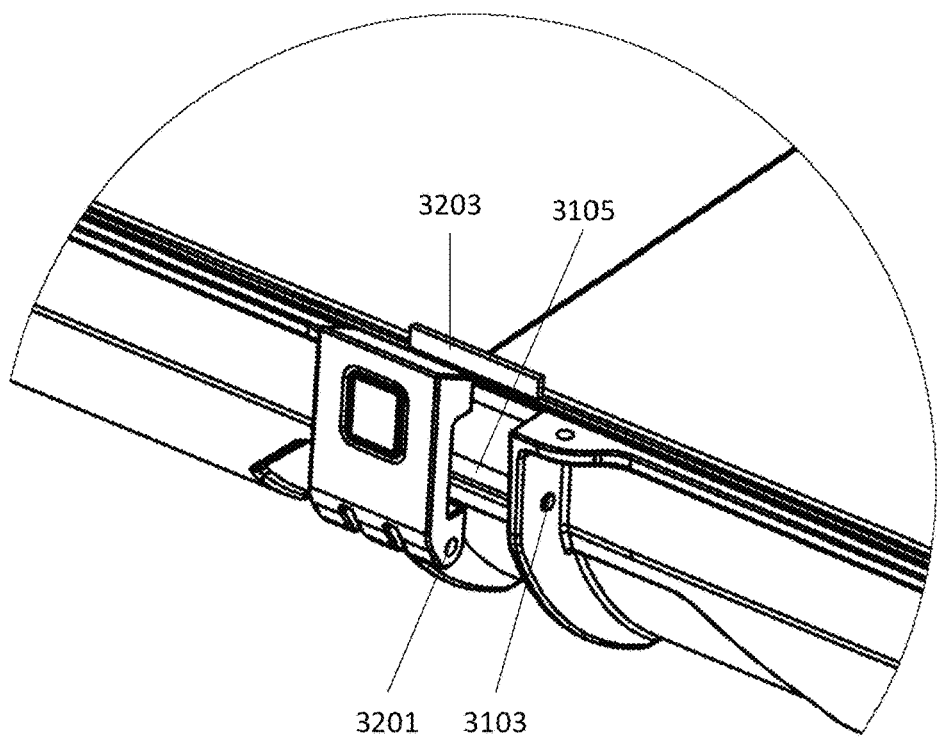
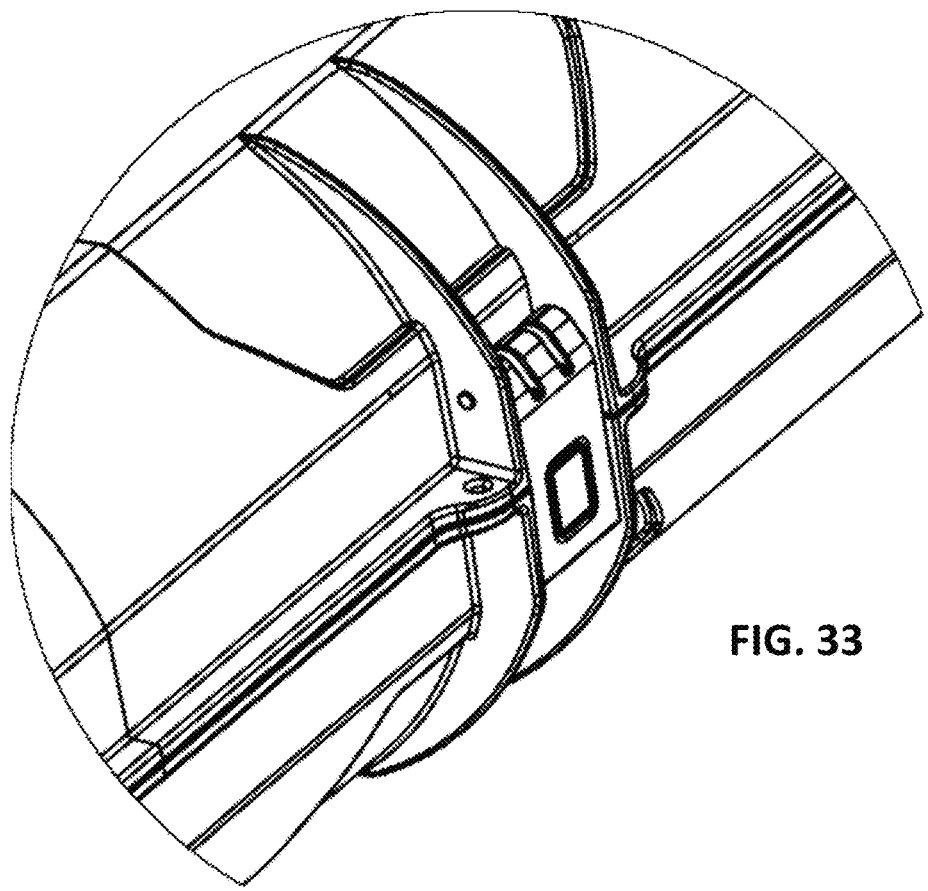
FIG. 33

FIG. 41
FIG. 39
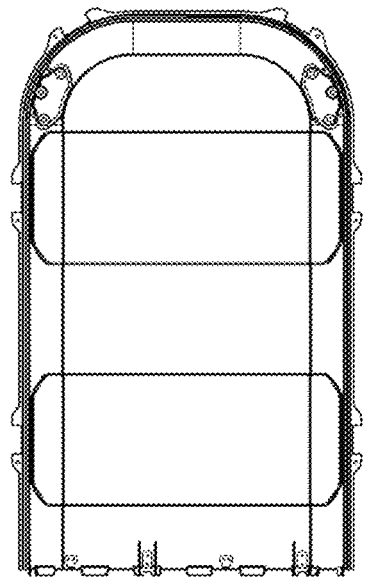
FIG. 40

COLLAPSIBLE HARD CASE FOR SURFBOARDS AND OTHER LARGE OBJECTS

CROSS-REFERENCE TO RELATED APPLICATIONS

This application is related to and claims priority from the following US patents and patent applications. This application is a continuation of application Ser. No. 15/865,910, filed Jan. 9, 2018, which is a continuation-in-part of application Ser. No. 14/684,734, filed Apr. 13, 2015, which is a continuation-in-part of application Ser. No. 14/195,501, filed Mar. 3, 2014, now U.S. Pat. No. 9,010,559, which is a continuation-in-part of application Ser. No. 13/748,356, filed Jan. 23, 2013, now U.S. Pat. No. 8,668,104, which is a continuation of application Ser. No. 13/224,904, filed Sep. 2, 2011, now U.S. Pat. No. 8,381,930, which is a continuation-in-part of application Ser. No. 12/462,216, filed Jul. 31, 2009, now U.S. Pat. No. 8,066,138, which claims the benefit of U.S. Provisional Application No. 61/137,560, filed Jul. 31, 2008, each of which is in incorporated herein by reference in its entirety.

BACKGROUND OF THE INVENTION

1. Field of the Invention

The present invention relates generally to travel cases or containers, and more particularly to a collapsible hard case for protectively transporting a large object.

2. Description of the Prior Art

Protective travel cases are generally known. By way of example, U.S. Publication 2004/0232016 provides a telescoping hard case for carrying a golf bag and U.S. Pat. No. 3,628,655 discloses a sectional, convertible wig case.

In particular, regarding surfboards, typically surfers travel to remote destinations for participating in the sport, especially for competitions, vacations, etc. Additionally, boards are shipped from manufacturers to distributors, retailers and customers using an archaic, damage prone method of cardboard, bubble wrap and duct tape packaging. There are currently no convenient methods for shipping such boards. Problematically, shipment of surfboards or transport in air cargo damages the board surface and introduces structural stresses that the boards were not designed to be exposed to. In many cases, incidental damage to boards during travel and/or transportation can functionally ruin a surfboard. In a specific circumstance, applicant's surfboard was destroyed by a baggage handler in airline transport to Hawaii from the continental US. Since boards are expensive and surfers typically prefer to use their own board rather than generic boards, especially for more advanced surfers and professionals in competition, there has been a need to provide a protective shipping case or container for surfboards.

Typically, however, containers for shipment of large objects, such as the size of a surfboard, are large and bulky. Upon safe transport of the surfboard then, the container must be stored in a correspondingly large space. Surfboards often range in length from 6-10 feet, in width between about 2-3 feet, and in depth about 3 inches.

One commercially available surfboard case offered at the time of the present invention is by Santa Monica Hard Case in California, USA. While this product provides a protective case for surfboards, it is formed of a flexible plastic that leaves the boards vulnerable to damage during transport or shipment. Also, it has limited size options and features. Furthermore, this case does not collapse into itself.

Thus there remains a need for a protective case for surfboards that also provides for convenient storage when not in use and for ease of transport when carried.

SUMMARY OF THE INVENTION

A first aspect of the present invention is to provide a collapsible protective case for large objects. The protective case includes at least one extension lock configured for locking the case in a fully expanded position for completely protectively and removably containing the large object, and to be alternatively collapsed to a collapsed position when not in use A second aspect of the present invention is to provide an extension lock with a lock housing and a compression latch. The compression latch has a compressive component configured to descend out of the lock housing and compressingly lock the case in an extended position and to ascend into the housing when unlocked, allowing the case to telescope into a compacted configuration.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 29 illustrates a detail view and profile of one embodiment of interlocking male-female edges of two sections.

FIG. 32 illustrates a detail exploded view of a latch of one modular section embodiment.

FIG. 33 illustrates a detail view of an assembled vertical latch of two connected modular sections.

FIG. 39 illustrates a top orthogonal view of one embodiment of an end section.

FIG. 40 illustrates a right side orthogonal view of one embodiment of an end section.

FIG. 41 illustrates a rear orthogonal view of one embodiment of an end section.

DETAILED DESCRIPTION

Figure 1:
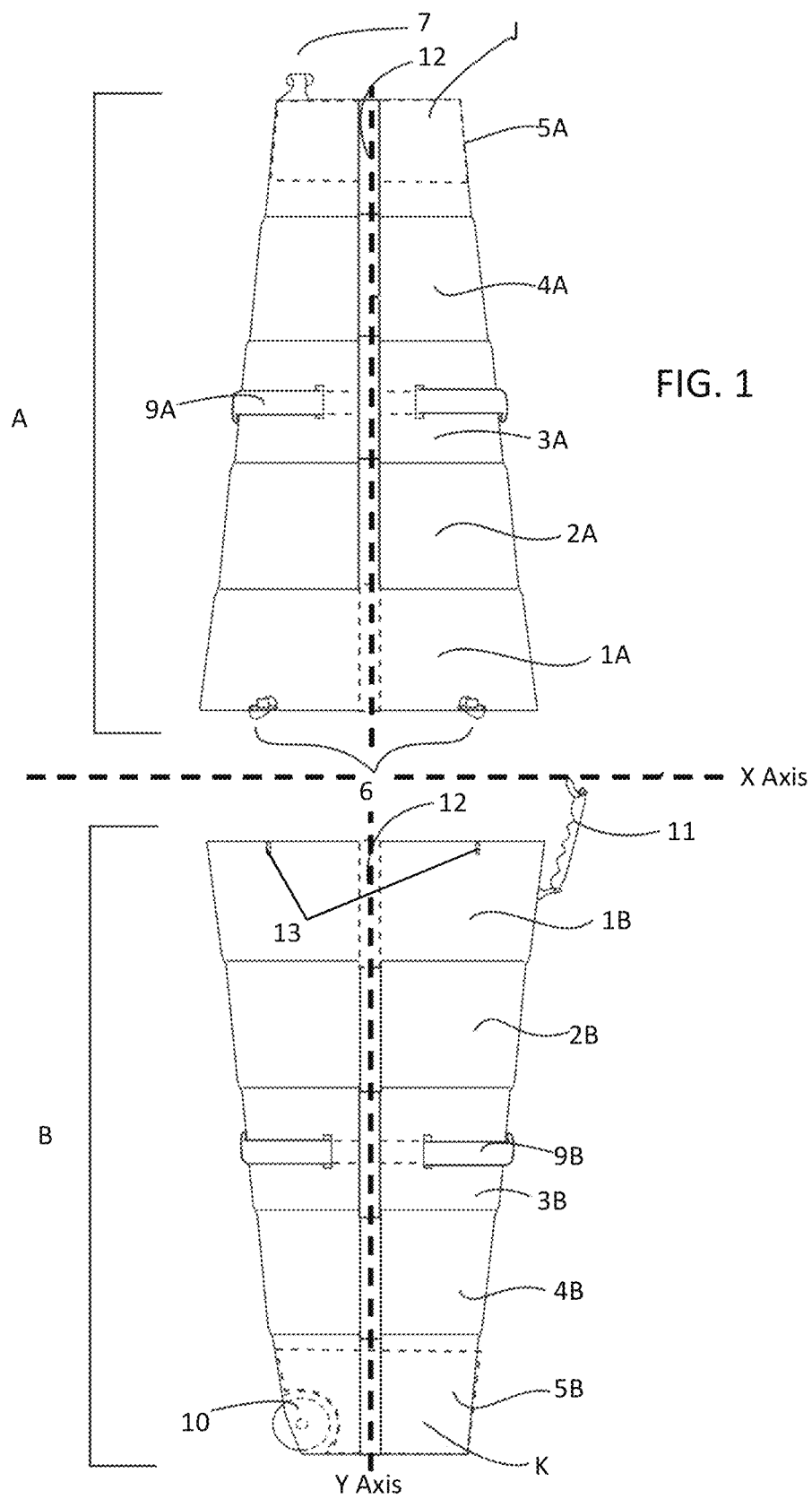
FIG. 1 illustrates a front view of a protective case in an extended position according to one embodiment of the present invention.

Referring now to the drawings in general, the illustrations are for the purpose of describing preferred embodiments of the invention and are not intended to limit the invention thereto.

The present invention provides a protective case for large objects constructed and configured to be used in expanded, intermediate and collapsed positions for completely protectively containing the object when housed, and to be alternatively configured in a collapsed position for storage of the case when not in use, i.e., when the object is not stored therewithin. More particularly, the present invention includes a collapsible protective case for large objects with a housing having a rigid, impact-resistant outer surface, the housing being formed from a multiplicity of adjoining sections that are selectively configurable between expanded, intermediate and collapsed positions.

Preferably, the rigid, impact-resistance outer surface is formed from a hard plastic or composite material that is sufficiently thick to prevent puncture or tearing and resist pressure, flexing or deformation, such that the object contained completely within the housing is protected from external forces. Varying dimensions of the outer surface depend on the object or objects being stored, the transportation conditions, and the amount of protection desired. In one embodiment, the hard plastic shell is between 1/32 and 1/4 inches thick, preferably about 3/32 inches thick.

Figure 2:
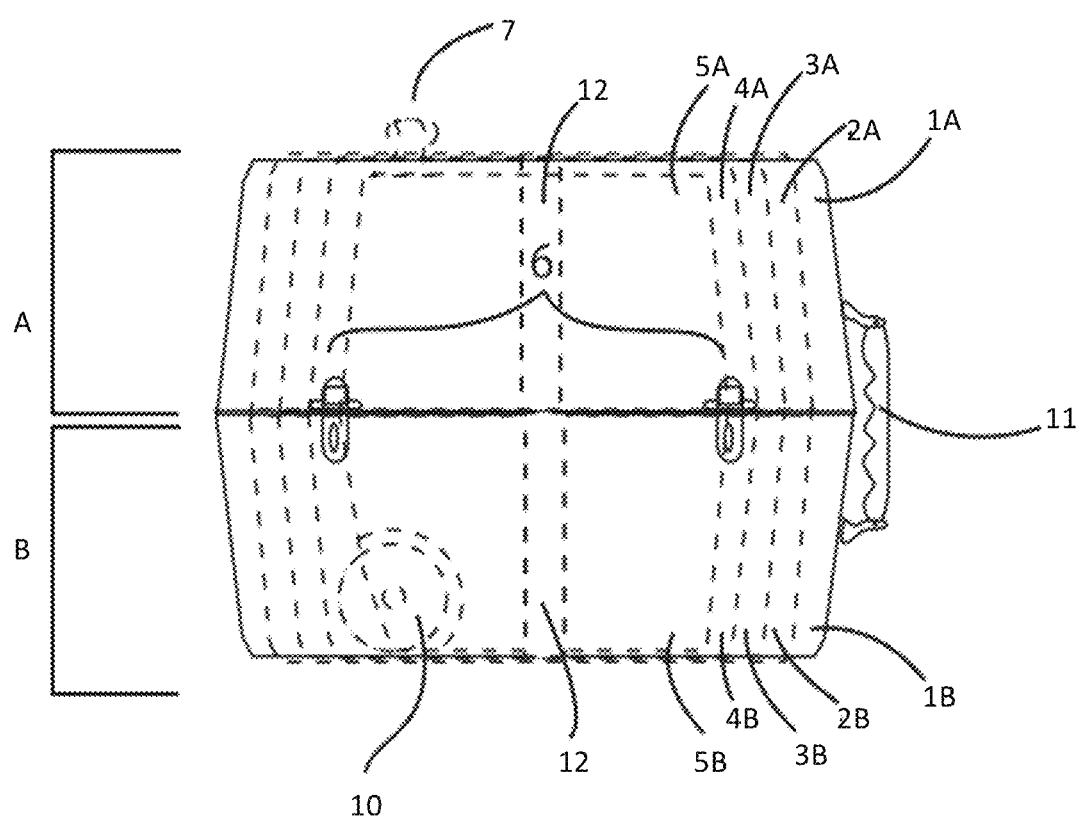
FIG. 2 illustrates an end view of the case shown in FIG. 1 in a collapsed position according to one embodiment of the present invention.
Figure 3:
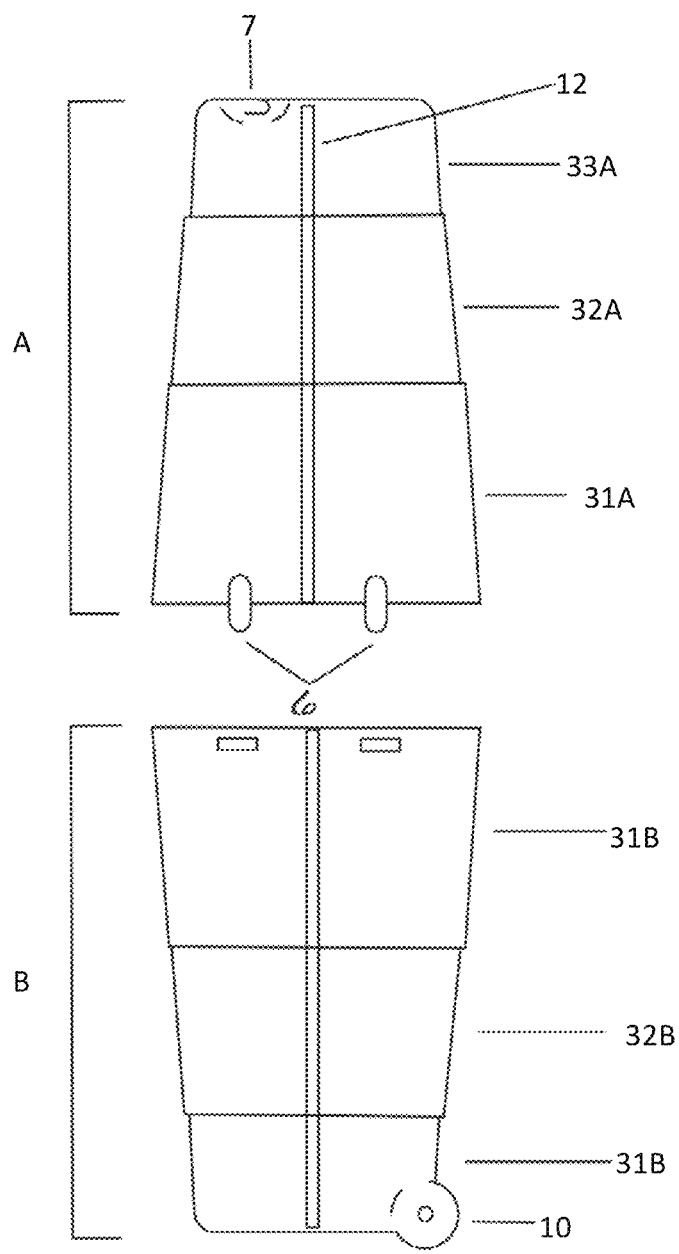
FIG. 3 illustrates a side view of another embodiment of the present invention.
Figure 4:
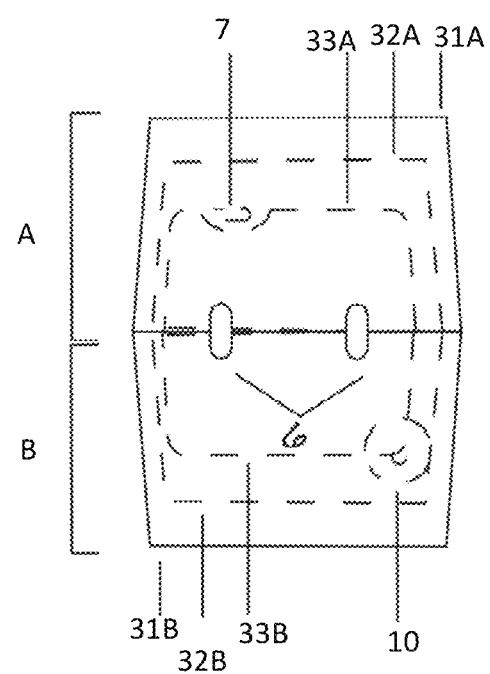
FIG. 4 illustrates an end view of another embodiment of the present invention.

In one embodiment, illustrated by FIGS. 1-3, the housing is preferably formed from two mating sections A and B for completely encasing the object or objects from either end. Sections A and B are releasably connectable and lockable at the adjoining edges that form the middle of the housing. In one embodiment, the two separated sections A and B are approximately equal in size and dimensions. As shown in FIG. 1, with the exception of the wheels 10 and end case handle 7, the housing is preferably symmetrical about the long axis Y and about the short axis X, in order to improve the balance of the housing in each position.

FIGS. 1 and 3 illustrate each of the two sections A and B being further comprised of subsections or cells (1A-5A, 1B-5B, 31A-33A and 31B-33B) that are constructed and configured to be juxtapositioned in the extended position. As illustrated in the FIGS. 1 and 3, innermost subsections 1A/B and 31A/B have larger dimensions that outermost end subsections 5A/B and 33A/B. When not being used for protectively encasing an object, these subsections collapse into each other substantially concentrically as illustrated in FIG. 2. In the collapsed position of FIG. 2, the housing of the present invention can conveniently be stored in a compact position, as illustrated by FIG. 3. In a preferred embodiment, each of the subsections is arranged so that the end-most subsections 5A/B and 33A/B collapse into the larger middle subsections 1A/B and 31A/B. Correspondingly, the intermediate subsections 2-4A/B and 32A/B collapse between end-most subsections 5A/B and 33A/B and middle subsections 1A/B and 31A/B as shown in FIGS. 2 and 3.

Referring to FIG. 1, sections A and B align longitudinally along the board length along track 12, which provides a notch and lock system providing a releasable securement of the subsections with respect to each other to form the rigid housing. Section A is releasably fastenable to the section B by a plurality of latches 6. In one embodiment, four latches are provided, as depicted in FIG. 1. Alternatively, two latches 6, one mirrored on each of two sides of the housing suffice. Alternatively, any number of latches 6 are positioned on subsection 1A or 31A with corresponding latch receptors 13 on subsection 1B or 31B. In any embodiment the latches 6 can be positioned on the exterior or interior of the housing or both, and optionally include a key or code locking mechanism.

In one embodiment, a carrying case handle 11 is attached to a side of the case for easier carrying, but is strategically placed to function as a releasable attaching latch for connecting the sections A and B. Optionally and additionally, wheels 10 are positioned on one section and a roller case handle 7 on the other section for easier transport of the case and object assembly. Also, optionally, a roof rack system 9A and 9B attached to one of the intermediate subsections 2A-4A and mirrored on one of the juxtaposed subsections 2B-4B is provided.

In one embodiment a lining 403 configured and positioned within the interior of the housing may be provided for additional protection and impact resistance for the large object(s). The lining may include an impact-absorbing or cushioning lining, such as foam, rubber or a coating, and may be affixed to the inner surface of at least one or all of the housing subsections or may be removably affixed to the one or more subsections. Optionally and alternatively, a protective flexible inner sleeve 404 may be used within the protective case; by way of example and not limitation, it may be independent of the housing and applied around the surfboard before the sleeve-wrapped board is inserted into the case. Preferably, the lining 403 and/or sleeve 404 dimensions are configured to provide flexibility in accommodating large object(s) of varying sizes and dimensions. Additionally, in an embodiment wherein both a lining 403 and sleeve 404 are provided, the sleeve may be at least substantially waterproof, thereby providing protection to the lining, which may be susceptible to mold or rot, or, alternatively the lining may be at least substantially resistance to wear and tear, thereby minimizing damage to the lining. Alternatively, the lining and/or sleeve itself may provide similar functionality, thereby minimizing similar damage to the housing.

In one embodiment, wherein a rubber sleeve 404 and foam lining or insert blocks J and K are provided, and wherein the large object is a surfboard, the surfboard would first be inserted into the sleeve and then the nose of the surfboard is slidingly placed into the block J at the end of subsection 5A while section A of the case is in a collapsed or intermediate position. Then the surfboard is pushed into the case, and the subsections 2A-5A are extended towards an expanded or intermediate position. Then the tail end of the surfboard is slidingly placed into the block K at the end of subsection 5B while section B of the case is in a collapsed or intermediate position. The subsections 2B-5B are then extended towards an expanded or intermediate position, thereby covering the remaining portion of the board not covered by section A. Sections A and B are attached by placing the latches 6 into a closed position (or releasably locked position). Optionally, the carrying case handle is additionally closed or releasably locked using latch 11.

FIG. 3 illustrates side and end views of another embodiment according to the present invention; more specifically, it shows the collapsible case in both extended and collapsed positions from a side view (extended position) and end view (collapsed position). In this embodiment, two equal sections A and B are shown, these sections being further divided into subsections 1-3A/B. Subsection 3A/B collapses into subsection 2A/B and both subsections 2A/B and 3A/B collapse into subsection 1A/B. These subsections collapse along a track 12 to ensure the subsections collapse and extend with ease, while the track 12 also provides rigidity. In an alternative embodiment, the segments fit snugly inside each other to provide rigidity and therefore do not require a track.

Latches 6 secure sections A and B to each other. A wheel mechanism 10 is used to roll the case and case handle 7 is used for pulling or carrying the case. In embodiments of the present invention, some of the sections or subsections are removable or insertable, allowing the case to be lengthened and shortened, thereby providing maximum size flexibility.

Figure 5:
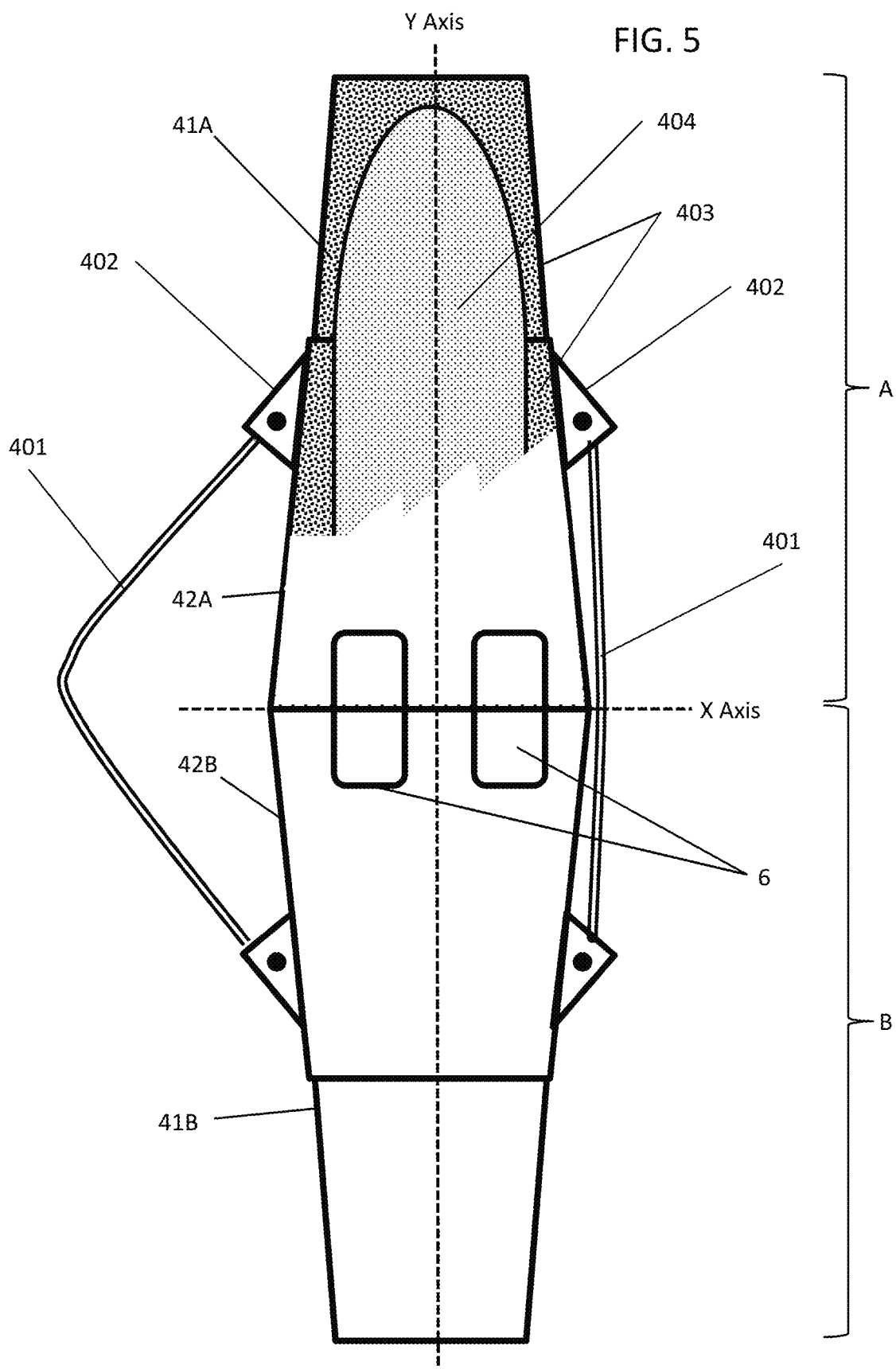
FIG. 5 illustrates a front view of a protective case in an extended position according to one embodiment of the present invention.

FIG. 5 illustrates another embodiment of the present invention, wherein at least one strap 401 is attached to bosses 402 located on the exterior of the housing sections A and B. Each strap is attached to the case with a securement mechanism, the securement mechanism preferably being a strap attachment boss 402, as depicted in FIG. 5. The strap attachment boss may be a separate piece connected to the case or integral to the outer housing manufacture. For example, and not by limitation, the boss 402 may be an integral feature of an injection molded section 401-402A/B, as depicted in FIG. 5. Further, the strap and boss design is capable of being mirrored or duplicated on one or more other sides or sections. One embodiment of mirrored bosses is depicted in FIG. 5. Furthermore, the strap is comprised of any suitable material or fabric, such that the weight of the case and enclosed object(s) are capable of being lifted from a resting position without risk of tear or breakage. In a preferred embodiment, four bosses 402 and two straps 401 are included in the case design, as depicted in FIG. 5.

In one embodiment, a strap is positioned and secured between two bosses, the two bosses equally positioned from the apex 406 of the case. In such an embodiment, the strap is adjustable in length through the boss, such that the slack of the strap may be configured to the particular user and situation. In one embodiment, a hook-and-loop-type fastener is provided as a means of releasably attaching one end of a strap to a portion of the strap body for securing the strap in a fixed position. In another embodiment, a first boss may house a retractable cord mechanism and the other boss, being mirrored in a position across the apex on the same housing side, may house a releasable attachment mechanism. By way of example and not a limitation, the retractable cord mechanism may be similar to the mechanisms described in U.S. Pat. No. 8,096,740 by inventors Parker, et al., U.S. Pat. No. 6,053,381 by inventors Fahl, et al. or U.S. Publication 2011/126778 by inventor Lucy Mitchell, each of which is incorporated by reference herein in its entirety, such that the excess strap remains housed within the boss and is lockable in a multiplicity of lengths. Also, by way of example and not a limitation, the releasable attachment mechanism may be a selectably releasable clasp.

In one embodiment, the strap can be adjusted to give greater slack, so that the user-transporter can place the strap over the shoulder. Alternatively, the strap can be tightened to remove any excess slack, allowing the user-transporter to carry the case by placing the strap within the grip of a hand instead of over the shoulder. As one skilled in the art would appreciate, the strap is adjustable to any length in any of the expanded, intermediate or collapsed positions, such that the case may be carried over the shoulder, with the hand, or attachable to another system, such as to a rack or over a hook. Also, according to embodiments of the present invention, wherein the case is in an intermediate or collapsed position, the strap can be configured to act as a restraining strap around the case, thereby preventing the case from accidentally expanding.

In another embodiment, wherein the case is attachable to an automobile luggage rack, the method of attaching the case to the rack includes steps of: disengaging one side of the strap from one boss, placing the case on the rack with the disengaged strap side of the housing facing down, looping the strap from the remaining attached boss around the rack, reengaging the strap to the disengaged boss, and firmly tightening the strap.

Figure 6:
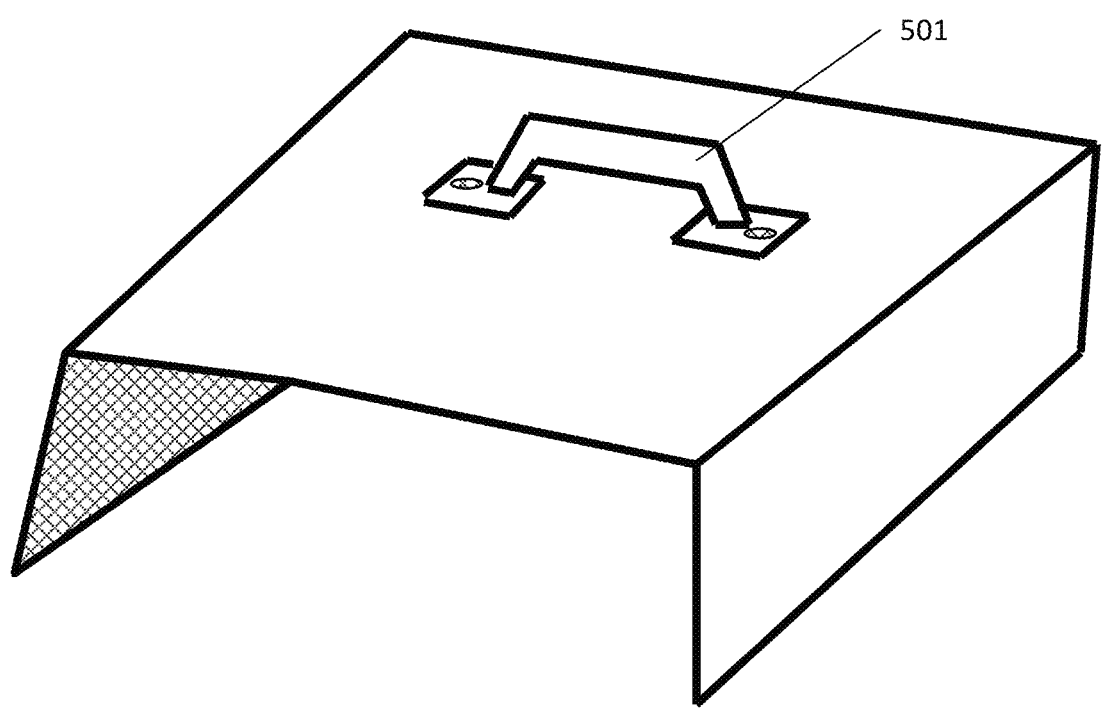
FIG. 6 illustrates a subsection having a case handle according to one embodiment of the invention.

FIG. 6 illustrates another embodiment of the present invention, wherein a case handle 501 is affixed to at least one section of the case to aid in transportation. Preferably the case handle is centered on the case, section and/or subsection. Optionally, the case handle is riveted to the case, as depicted in FIG. 6. The case handle 501 is comprised of a metal, a metal encased in rubber, or any other suitable material.

Figure 7:
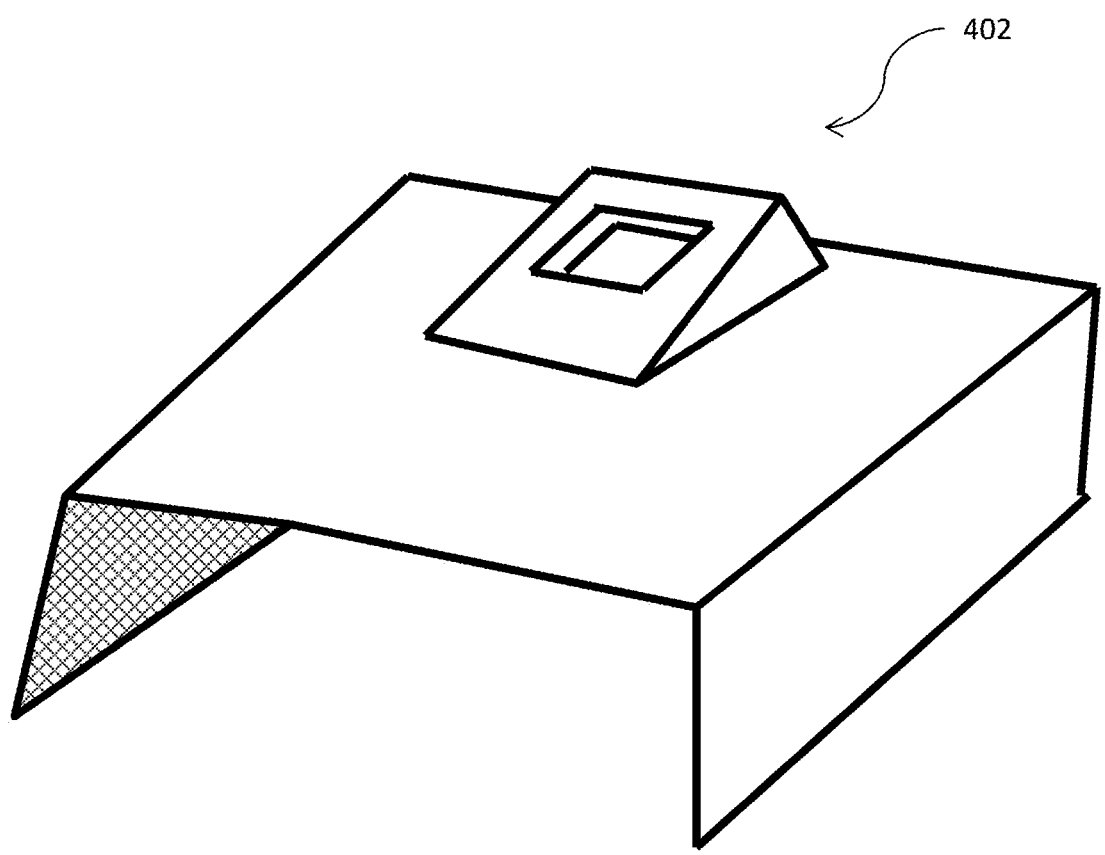
FIG. 7 illustrates a subsection having a boss according to one embodiment of the invention.

Notably, the strap attachment boss 402 serves at least two purposes: (1) a securement mechanism for the strap, and (2) an anti-rocking mechanism for the case when in a resting position. As depicted in FIG. 5, the collapsible and adjoining sections create a substantially diamond-shaped silhouette when the case is viewed from the side. Because the center of the case has the greatest height at the apex, when the case is in a resting position it may have a tendency to tilt to one end or the other. A pair of strap attachment bosses 402, individually depicted in FIG. 7, when positioned on the bottom of the case, prevents the case from tilting or rocking in either direction. This advantageous feature provides stability and reduces the risk of injury or damage.

In the case of use for a surfboard, each section is about half the length of a surfboard but slightly larger to properly and protectively secure the surfboard therein when combined together. In the case of use for an asymmetrical object or objects, such as golf clubs, musical instrument, etc., the sections and subsections may remain symmetrical and either (1) inserts are provided and/or (2) the housing is configured in one of the intermediate positions to compensate for the asymmetry of the object(s) and provide protection to the object(s). In the embodiment wherein inserts are provided, at least one insert is placed in a subsection of section A or B or both. By conforming the interior of the housing to provide an improved fit to the large object or objects, whether through the use of inserts or intermediate positions or both, the large object(s) are less likely to move within the housing during transport, thereby minimizing damage or disorganization of the object(s).

Figure 8:
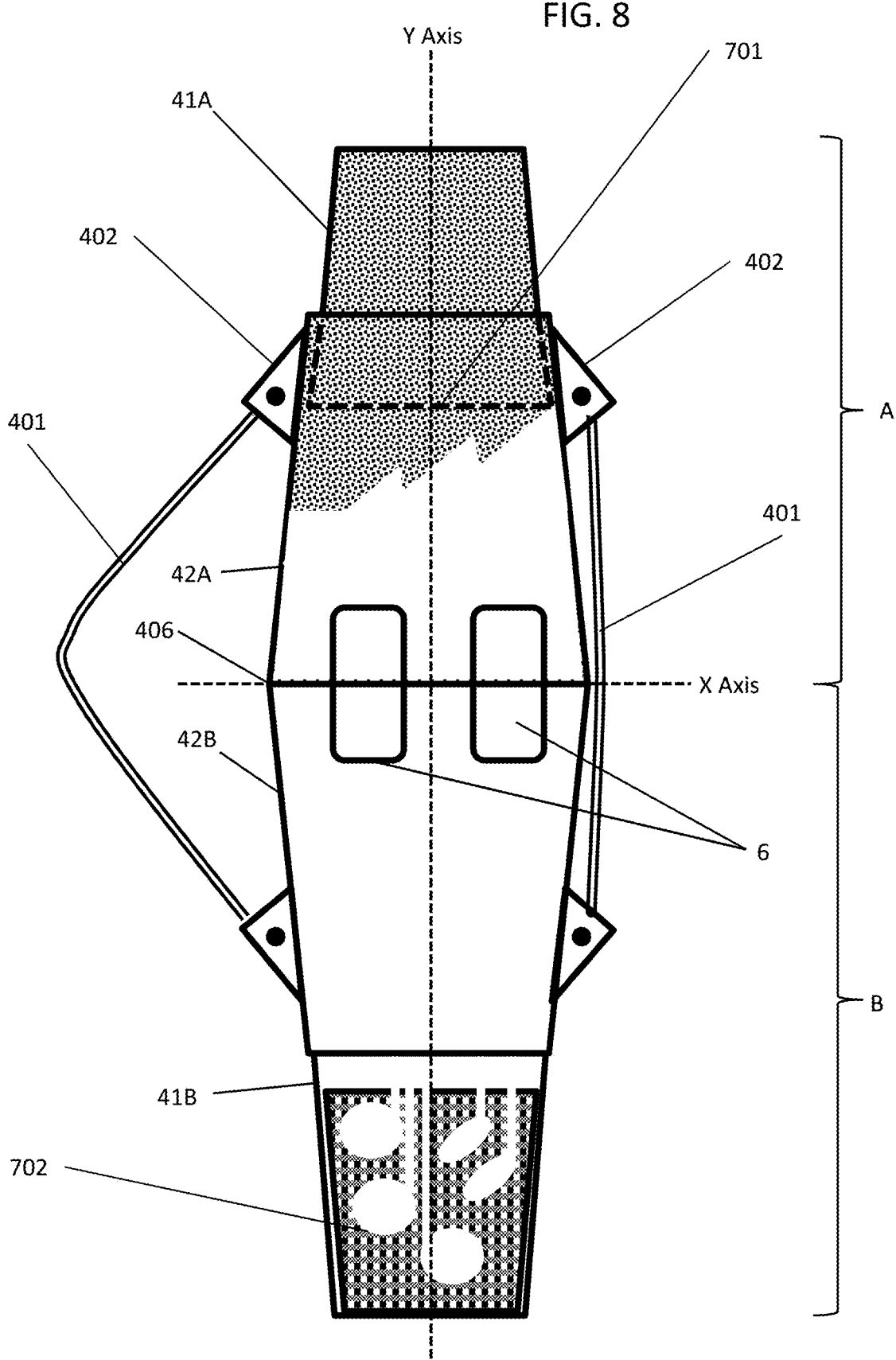
FIG. 8 illustrates a front view of a protective case in an intermediate position and having an insert according to one embodiment of the invention.

FIG. 8 illustrates an embodiment having an insert and configuring a subsection into an intermediate position to provide a better fit for the object(s), in this case golf clubs. Subsection 41A is configured into intermediate position 701 so as to remove any excess volume from the interior of the housing when the golf clubs are housed therewithin. Additionally, golf club insert 702 is placed within subsection 41B to provide a tighter fit within this subsection, thereby minimizing the movement of the clubs during transport. As one skilled in the art would appreciate, any number of designs and configurations could be included as an insert in order to contain portions of a housed large object(s).

In another embodiment, the case includes a housing having a rigid, impact-resistant outer surface, the housing being formed from two equal halves, each half having a multiplicity of adjoining sections that are selectively configurable between an expanded transport position and a collapsed storage position; the housing being symmetrical about the long axis and about the short axis. Furthermore, in another embodiment, the housing halves have equal number of adjoining sections and the housing halves are symmetrical when in an expanded or collapsed position.

Figure 9:
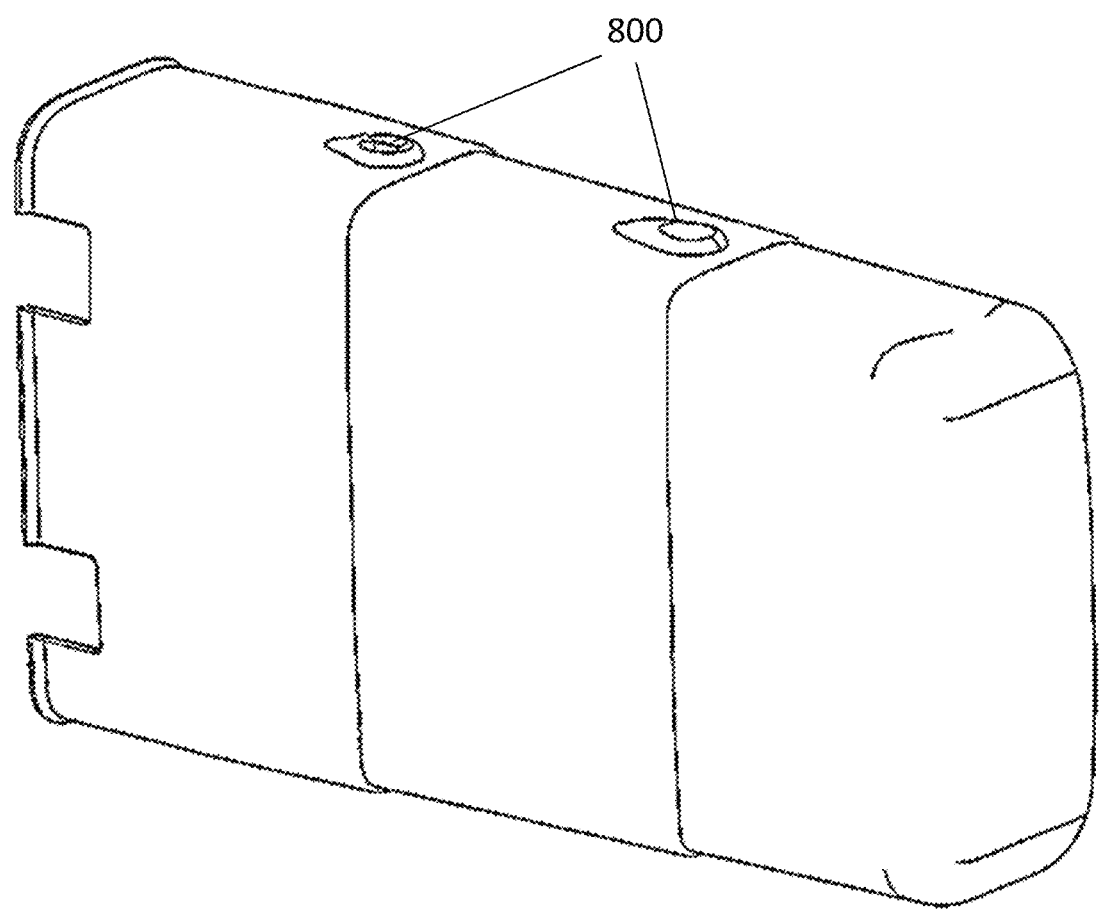
FIG. 9 illustrates a perspective view of a protective case according to one embodiment of the invention with two lock housings for two extension locks visible.
Figure 10:
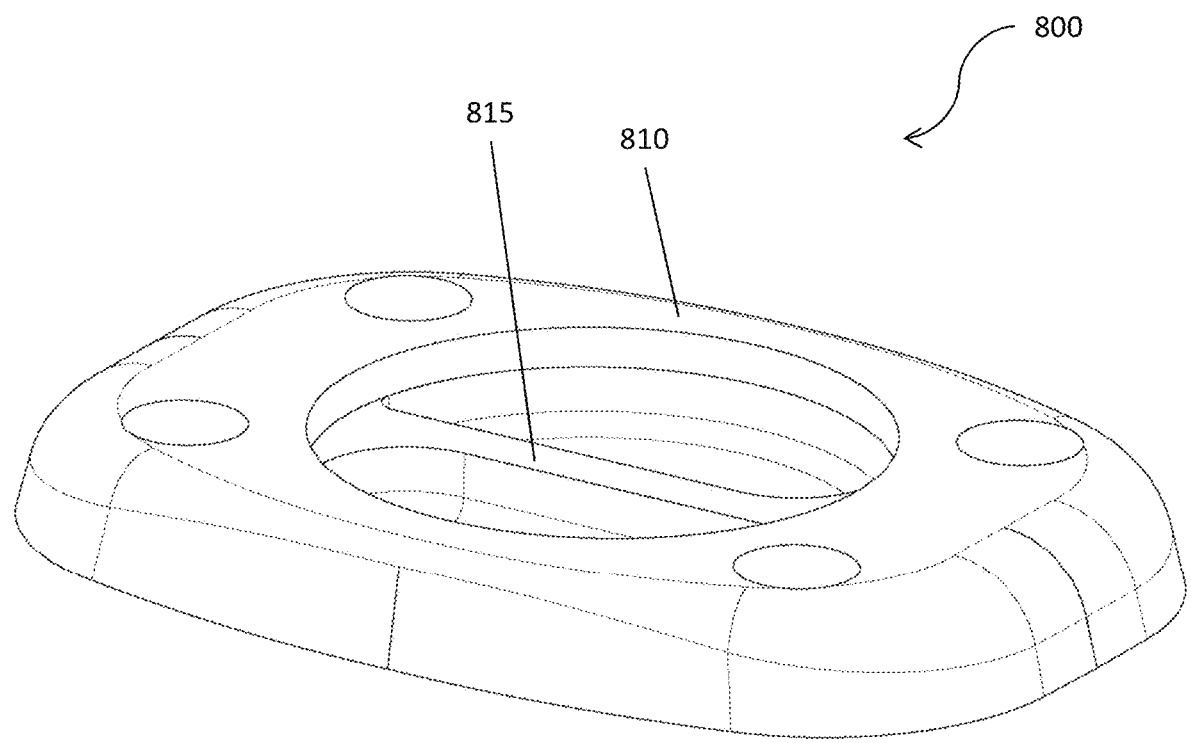
FIG. 10 illustrates a lock housing and a lock handle according to one embodiment of the invention.
Figure 11A:
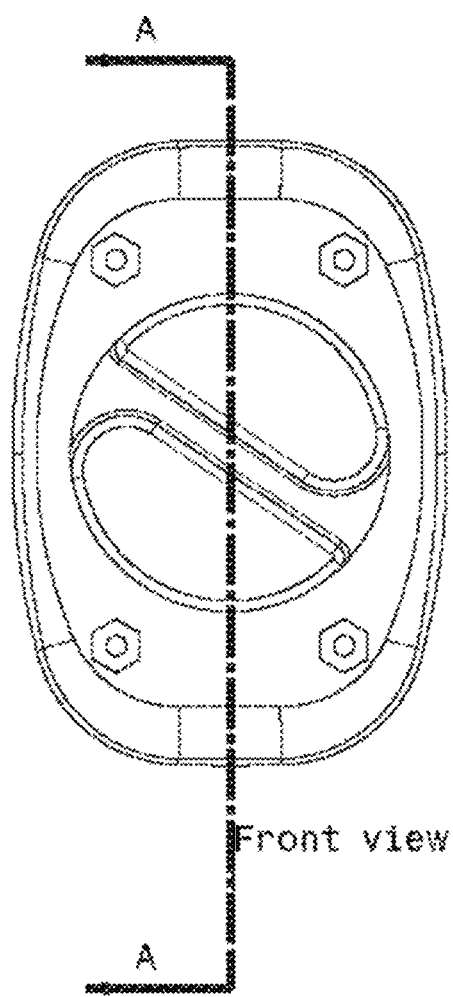
FIG. 11A illustrates a top view of a lock housing and a lock handle according to one embodiment of the invention.
Figure 11B:
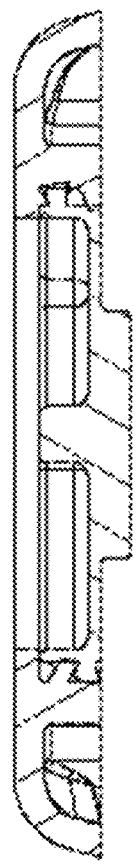
FIG. 11B illustrates a cross-sectional side of the lock housing and the lock handle of FIG. 11A along plane A-A.
Figure 12:
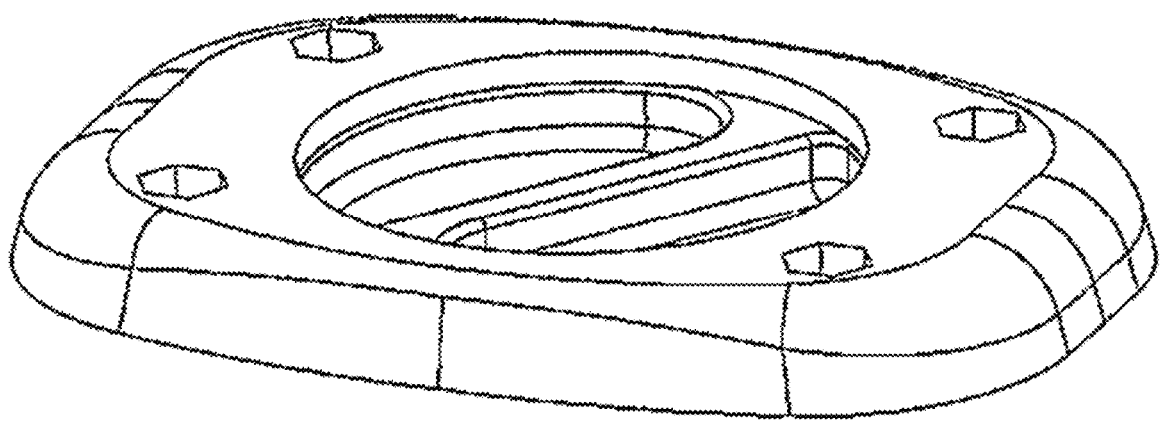
FIG. 12 illustrates a perspective view of a lock housing and a lock handle according to one embodiment of the invention.
Figure 13:
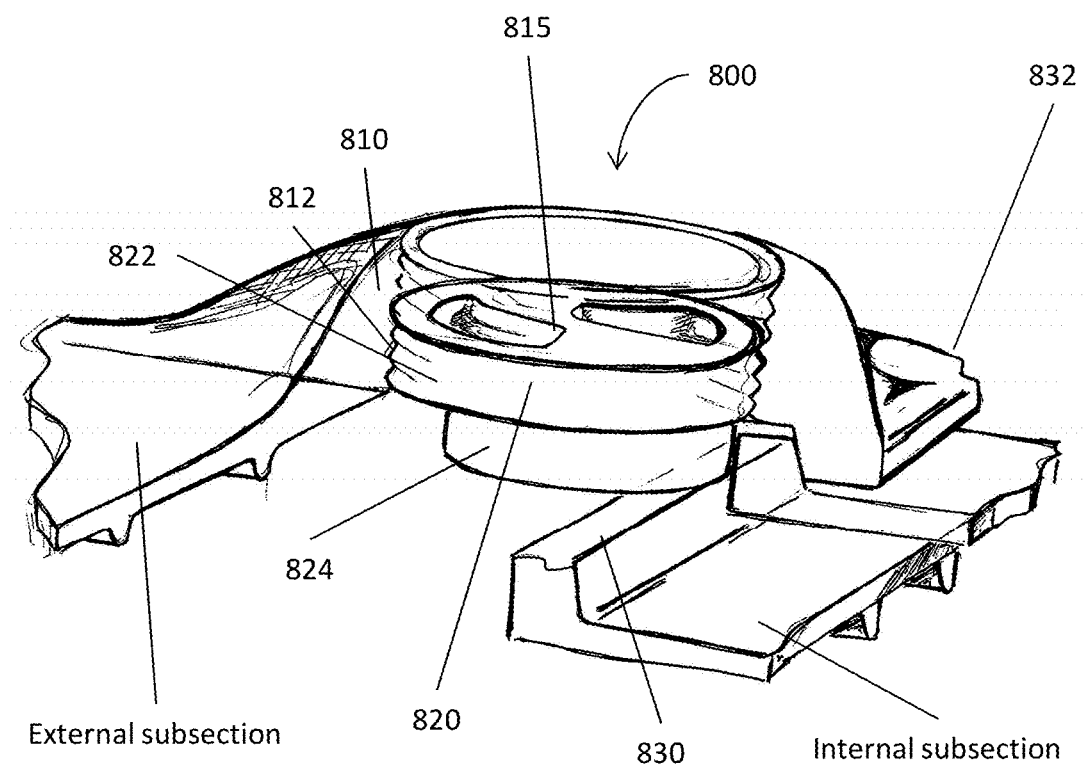
FIG. 13 illustrates a perspective line drawing of a lock housing and a lock handle according to one embodiment of the invention.

The present invention includes an extension lock to hold the subsections in an extended position. FIG. 9 shows a perspective view of a protective case with two extension locks 800. FIGS. 10, 11A and 11B and 12 show a preferred embodiment of a lock housing 810 and lock handle 815 for an extension lock 800. FIG. 13 shows a cut-away view of the extension lock 800. The extension lock is located on the distal end of a first subsection (away from the X axis, see FIG. 8) and is configured for locking the first subsection to a second subsection internal to the first subsection in an extended position. The extension lock, generally described as 800, includes a lock housing 810 and a compression latch 820. The lock housing includes a screw-threaded channel 812. The compression latch 820 includes a screw-threaded shaft 822 with a compressive component 824 on the internal end and a lock handle 815 on the external end. The screw-threaded shaft is configured to matingly engage with the screw-threaded channel of the lock housing. In a preferred embodiment, the compressive component is a cam and the compression latch is a cam latch.

Figure 14:
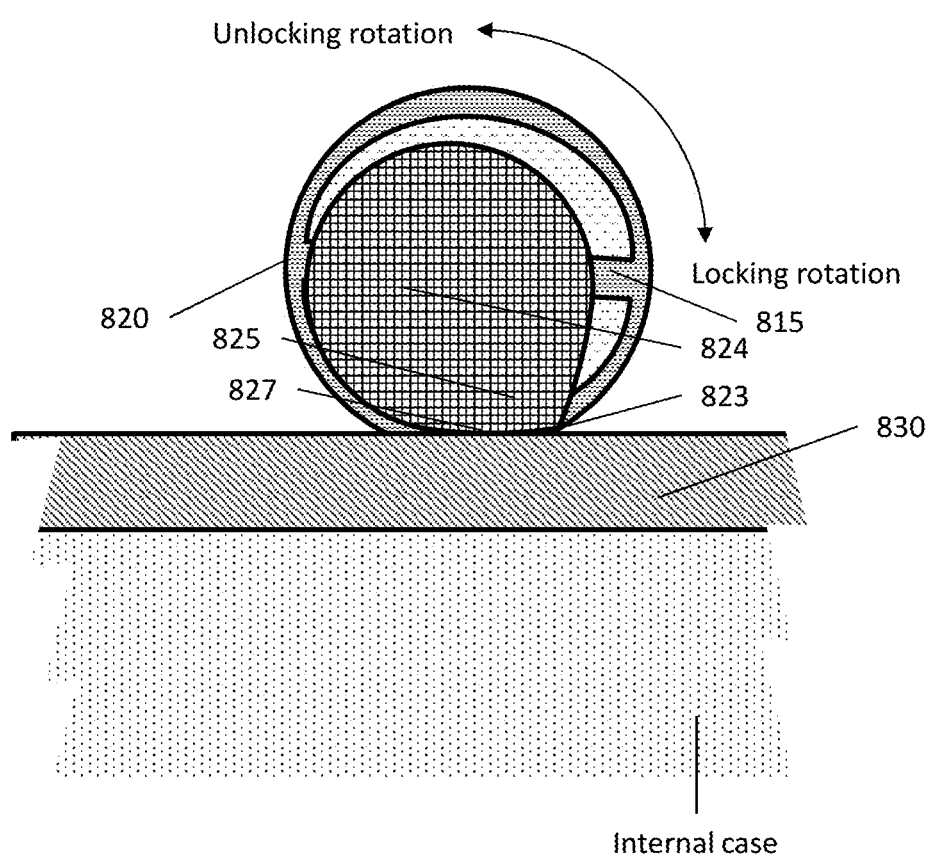
FIG. 14 illustrates a bottom view of a cam latch according to one embodiment of the invention.

FIG. 14 shows a bottom view of a cam latch 820 with the cam 824 and part of the lock handle 815 visible. The eccentric portion 825 of the cam is in the locked position against the internal subsection lip 830. FIG. 14 also shows the locking and unlocking direction of rotation for a right-handed lock. In an alternative embodiment the eccentric surface profile becomes flat in the last 10-15 degrees of handle rotation, allowing it to engage the internal subsection lip across a wider area and increasing the force necessary to rotate the lock handle away from engagement. In this configuration the cam includes an apex 823, which is the termination of the flat section 827. The dimensions of the cam are such that the cam can rise into the channel upon unlocking rotation.

Figure 15A:
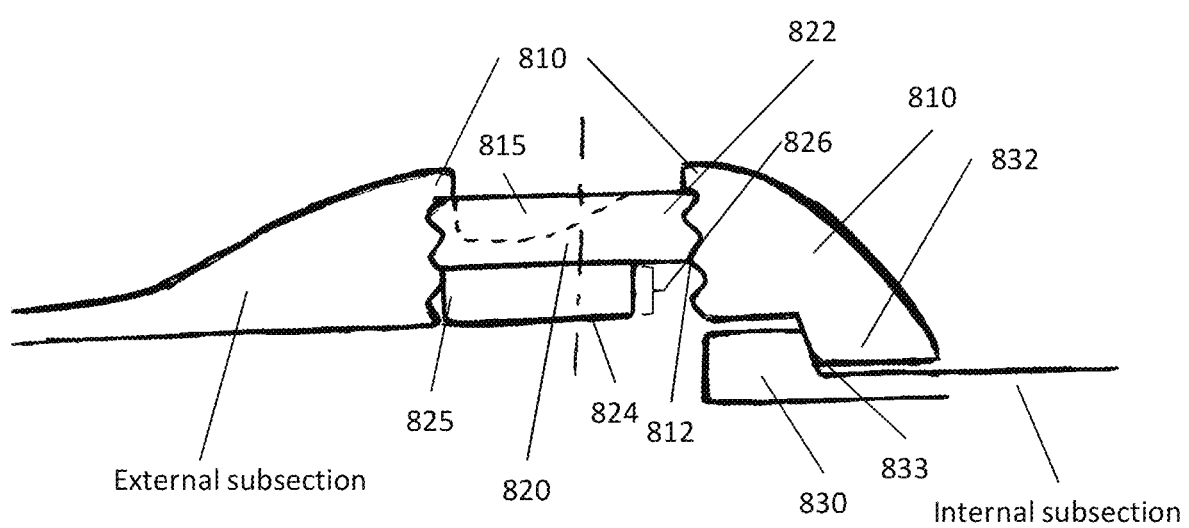
FIG. 15A illustrates a side view of an extension lock according to one embodiment of the invention in the unlocked position.
Figure 15B:
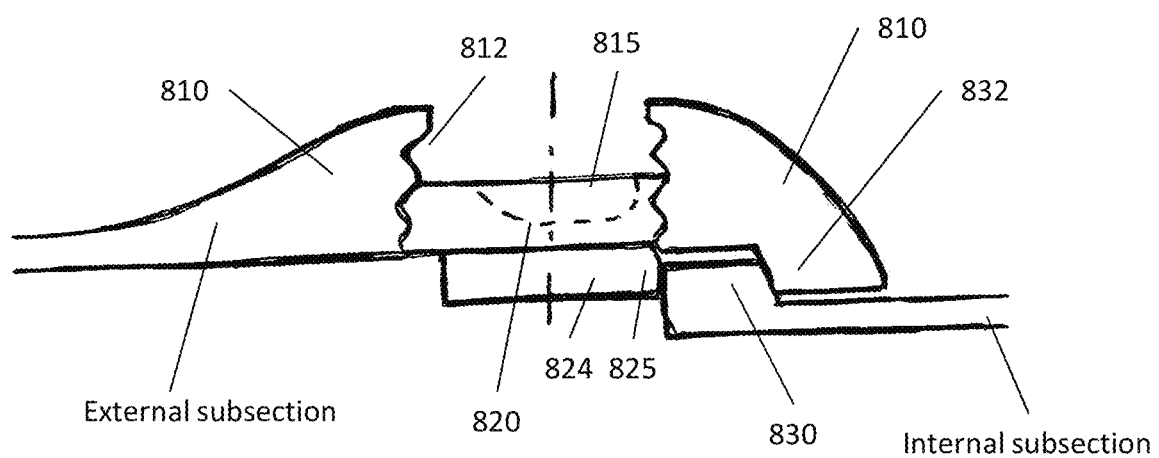
FIG. 15B illustrates a side view of an extension lock according to one embodiment of the invention in the locked position.

FIGS. 15A and 15B are cut-away side views of the extension lock installed. FIG. 15A shows the extension lock in an unlocked configuration. FIG. 15B shows the extension lock in a locked configuration.

This embodiment shows a screw-threaded shaft 822 with lock handle 815 on the exterior end and cam 824 on the interior end with eccentric section 825 and depth 826. The cam and eccentric section rotates about the axis of the lock handle and screw-threaded shaft. As the shaft is rotated down in the lock housing, the eccentric section progressively engages the proximal end of the internal subsection, progressively forcing the internal subsection distally into the extended position until the internal and external subsection lips engage. The lock handle is preferably rotated about 180 degrees to fully engage the eccentric portion with the internal subsection lip.

The cam latch is configured to descend in the lock housing (towards the Y-axis, see FIG. 8) and lock the internal subsection in an extended position upon rotation between about 180 degrees and about 270 degrees. Preferably the cam moves between locked and unlocked positions with about 180 degree rotation. The depth of the cam 826 is designed, constructed and configured such that it will move between locked and unlocked positions with the appropriate amount of rotation. In a preferred embodiment, the depth of the cam is approximately equal to about ½ the lead of the shaft screw-thread, such that the cam will completely move into and out of the lock housing upon about 180 degree rotation. In an alternate embodiment, the depth of the cam is about ¾ the lead of the shaft screw-thread, such that it will move between locked and unlocked positions upon about 270 degree rotation.

The locking occurs through the engagement of the internal subsection lip 830 with external subsection lip 832 at the point of engagement 833. The engagement prevents inward travel of the internal section. The cam latch is also configured to ascend in the lock housing upon 180 degree unlocking rotation of the cam latch. In a preferred embodiment, the cam 824 is configured to move completely into the lock housing with unlocking rotation between about 180 degrees and about 270 degrees, such that the internal subsections can telescope into the external subsection and are not obstructed by the cam when the extension lock is in the unlocked position.

The cam and/or cam latch are preferably made of an impact and abrasion resistant material, preferably a metal or toughened plastic; and the surfaces of the internal subsection that contact the cam are preferably lined with an impact and abrasion-resistant material, preferably a metal or a filled/toughened plastic.

Figure 16A:
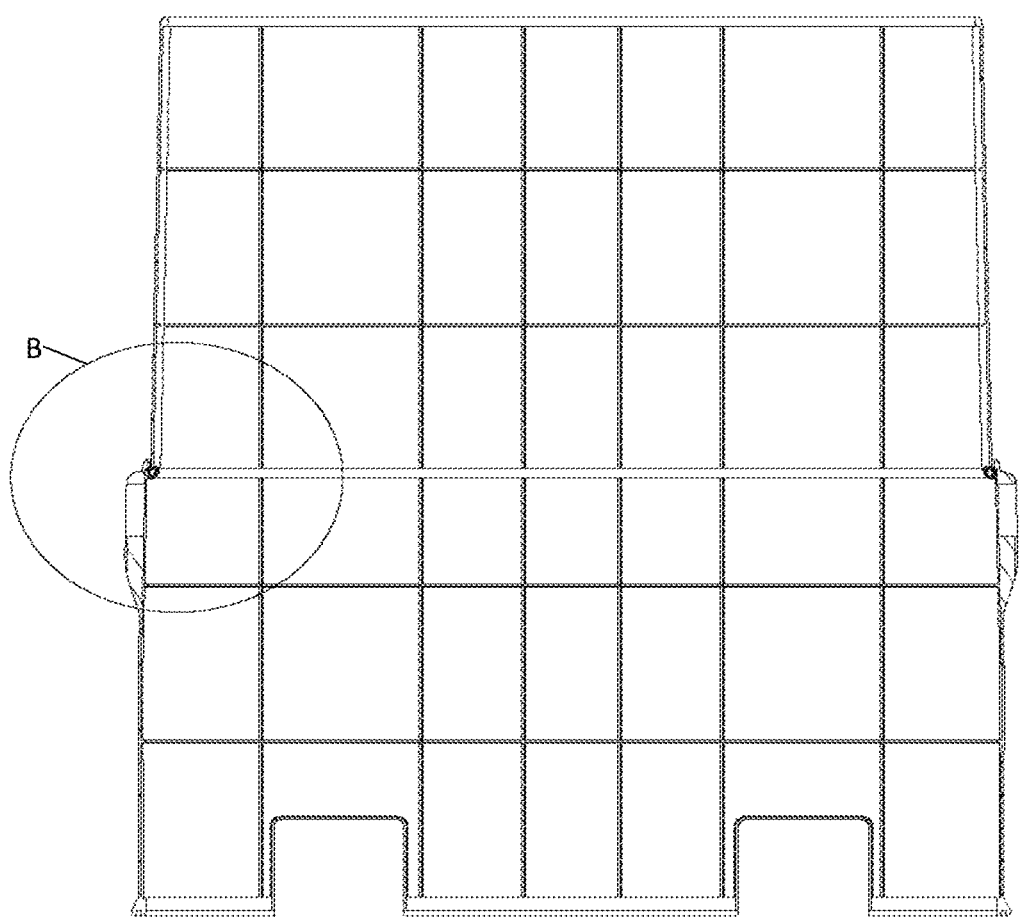
FIG. 16A illustrates a joint according to one embodiment of the invention.
Figure 16B:
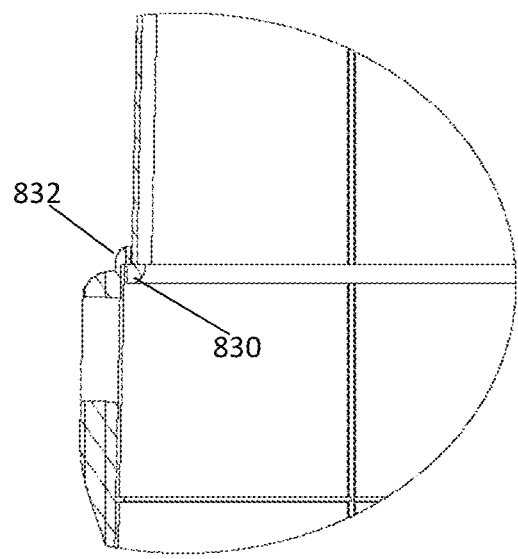
FIG. 16B is a magnification of area B of FIG. 16A showing a joint according to one embodiment of the invention.

FIGS. 16A and 16B also show the engagement of two subsections. FIG. 16B is a detailed view of area "B" of FIG. 16A, showing the engaged internal 830 and external 832 subsection lips.

Figure 17:
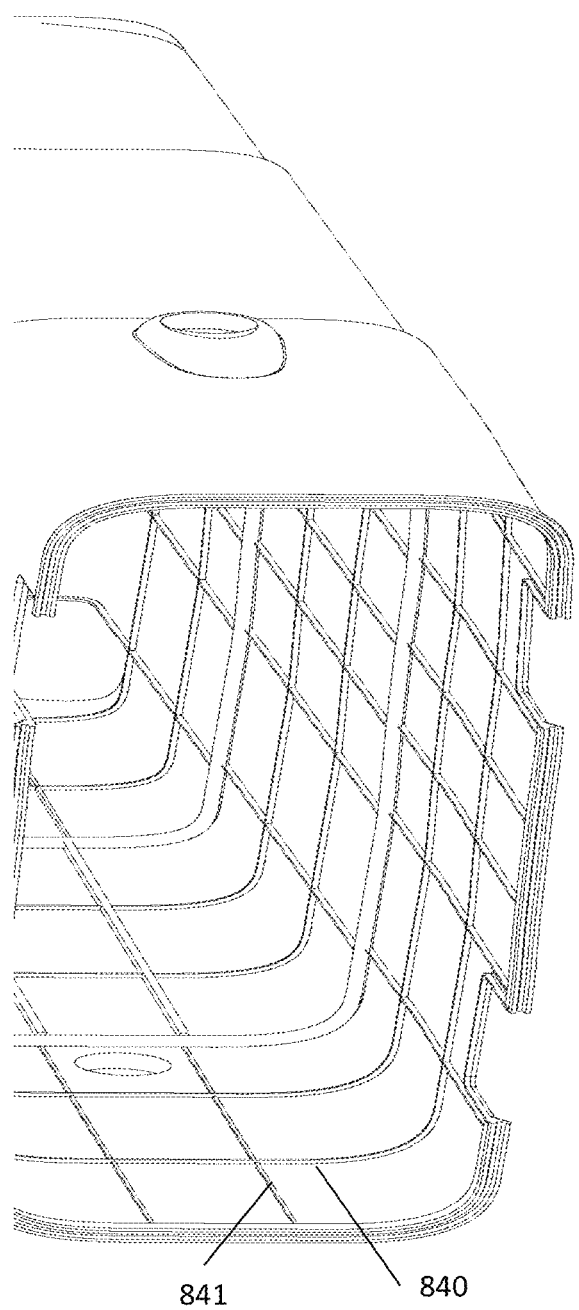
FIG. 17 illustrates the internal ribbing according to one embodiment of the invention.
Figure 18:
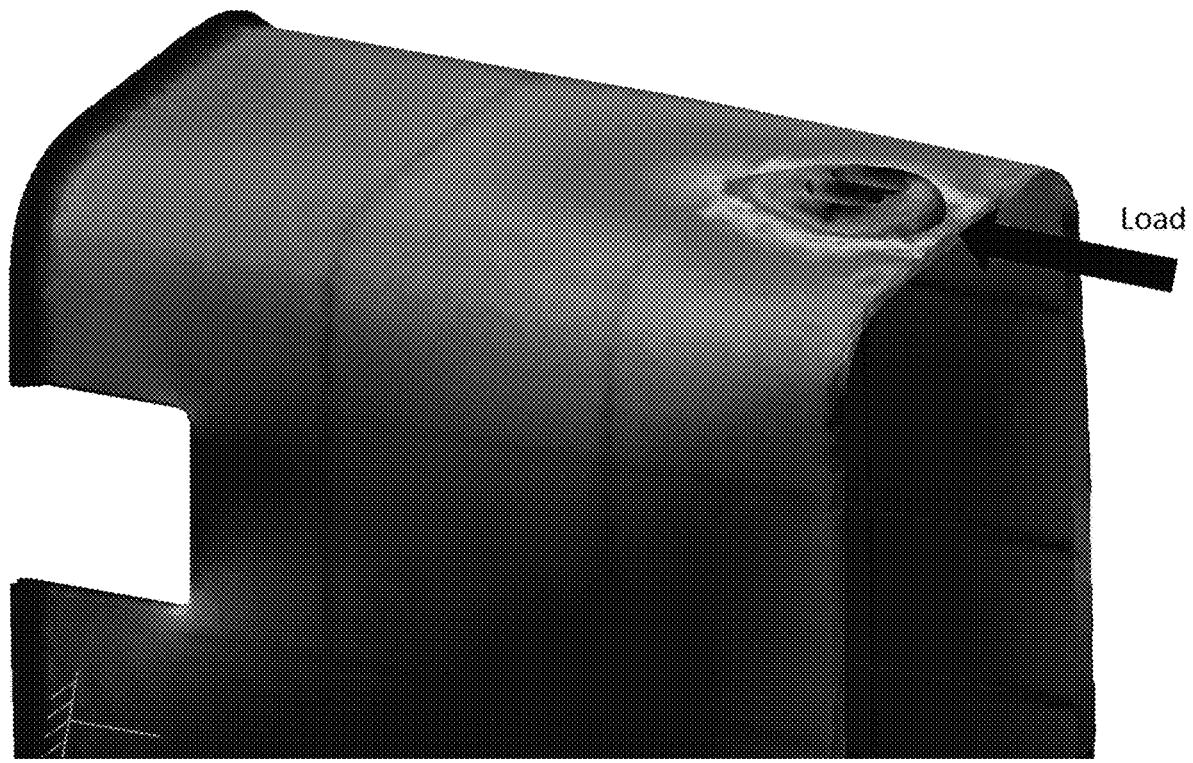
FIG. 18 is an illustration of the stress distribution as a result of an applied load at the case segment lock according to one embodiment of the invention.
Figure 19:
FIG. 19 is an illustration of the stress distribution as a result of an applied load at the case segment lock according to one embodiment of the invention.

The present invention preferably includes rib reinforcements. These are transverse ribs 840 (parallel to the X-axis) and longitudinal ribs 841 (parallel to the Y-axis), as shown in FIG. 17. The rib reinforcements preferably increase the bending moment of the flat panel sections of the case, thereby increasing their bending stiffness. These ribs also assist in distributing forces acting at the extension lock into the skin of the subsection. FIGS. 18 and 19 are images showing the stress distribution as a result of an applied load at the case segment lock. The force applied on an extended case subsection is transmitted into the inboard case subsection by bearing on the cam mechanism. This load is in turn transmitted into the lock housing of the cam mechanism. The tapered shape of the lock housing slowly distributes load into the skin and ribs of the case subsection. A measured distribution of load into the relatively thin skin of the case is desired so as not to overstress the material locally.

Figure 20:
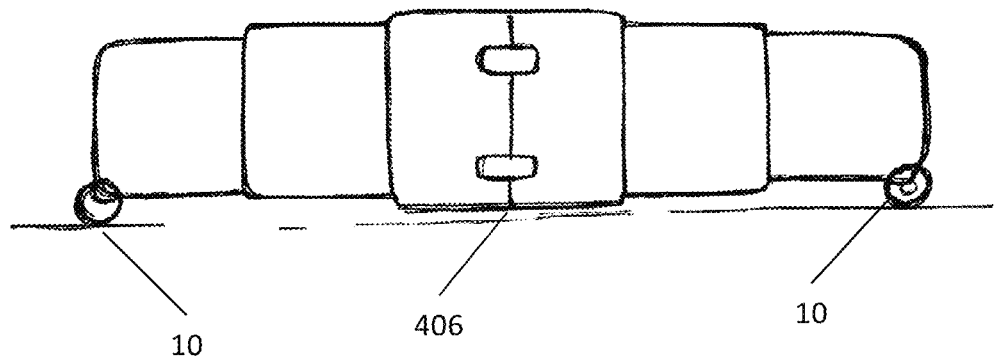
FIG. 20 is an illustration of an embodiment with the wheels positioned to stabilize the case when extended.
Figure 21:
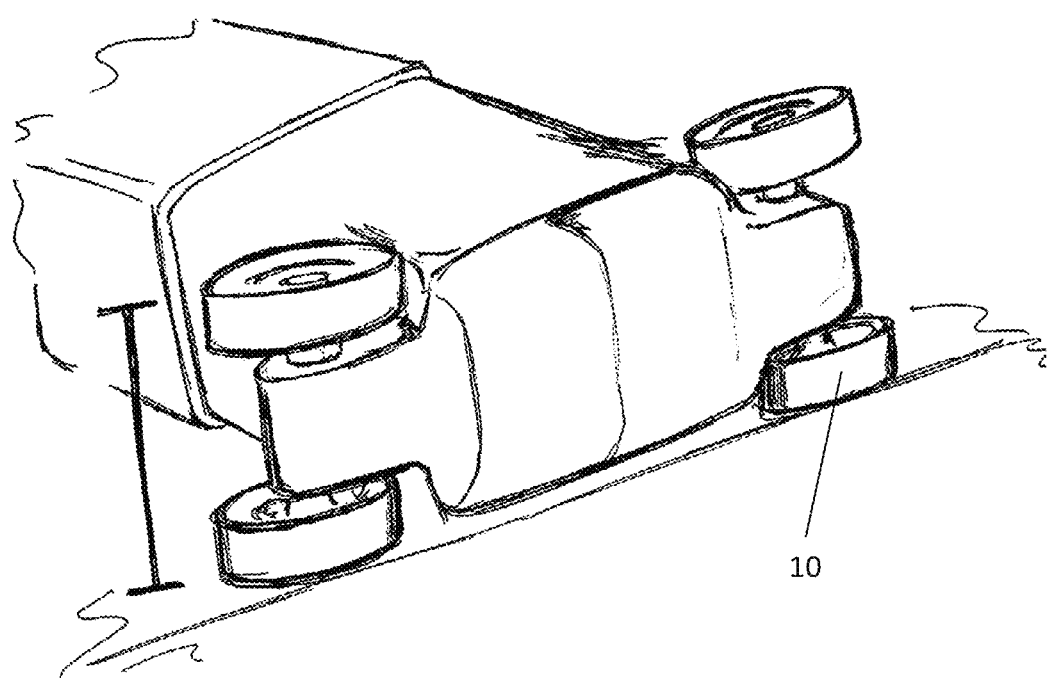
FIG. 21 is an illustration of an embodiment with the wheels positioned to mobilize the case when compacted.

Certain modifications and improvements will occur to those skilled in the art upon a reading of the foregoing description. For example, as shown in FIGS. 20 and 21, the wheels are optionally strategically placed so that they stabilize the case. In one embodiment, as shown in FIG. 20, the bottom of the wheels are level with the side of the case its apex 406 when fully extended so that there are 3 points of rest, thus stabilizing the case when lying extended on the side. The wheels can additionally be spaced widely to advantageously act as stabilizers when the case is lying flat and extended.

In another example embodiment shown in FIG. 21, there are at least 2 wheels that protrude wider than the case body to prevent it from rocking. Preferably, there are 4 wheels. The wheels limit the compaction of the case, such that the end segment still telescopes in but does not go all the way inside. The compacted case can be moved around on the wheels, facilitating moving the case when compacted. Also, the wheels act as a hard stop to compressing the case and in a preferred embodiment a strap is used to tie the case closed for storage.

Figure 22:
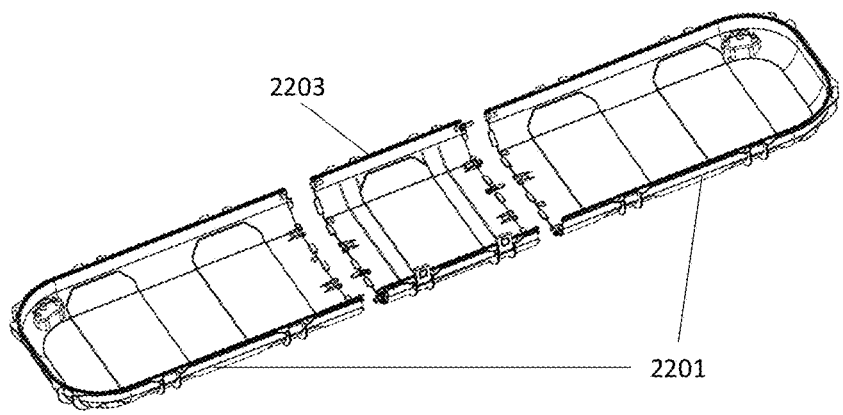
FIG. 22 illustrates a top perspective view of one embodiment of one half of a modular case.

In a modular design embodiment, the body is operable to be separated into modular sections for compactness and portability. FIG. 22 illustrates a top perspective view of one embodiment of the modular design, wherein one half of a case is composed of three sections: two identical end sections 2201 and one midsection 2203. In one embodiment, the two identical end sections 2201 are attached to each other without a midsection. Alternatively, one end section is connected to an end cap section. End caps provide for a shorter, more compact alternative to an end section. In one embodiment, end caps are approximately a quarter of the size of end sections. In a further embodiment, end caps are approximately a third of the size of end sections. However, one of ordinary skill in the art will recognize that midsections, end caps and end sections are operable to be any length, width, and depth. Thus, the case of the present invention provides for customization of the case for a variety of applications, including being used in shipping products of various dimensions and storing skis, snowboards, skateboards, surfboards, musical instruments, and sports equipment such as golf clubs, etc. While the embodiments illustrated are substantially rectangular and cuboid (or half-cuboids), in other embodiments the sections are any concave shape, including a cube, hemisphere, ellipsoid, spheroid, or sections thereof. Midsections are preferably approximately half the length of end sections and are equal in width and depth, wherein the depth is a measurement of the vertical concavity of the section. Further embodiments include multiple midsections, each of which is operable to connect to each other laterally for one half of a case and interlock edges with vertically positioned corresponding midsections in a hollow case configuration. This configuration allows for virtually any number of extensions in length of case, wherein the length of case is controlled by the number of midsections in the configuration and the length of the midsections. In one embodiment, each midsection is about 24 inches.

Figure 23:
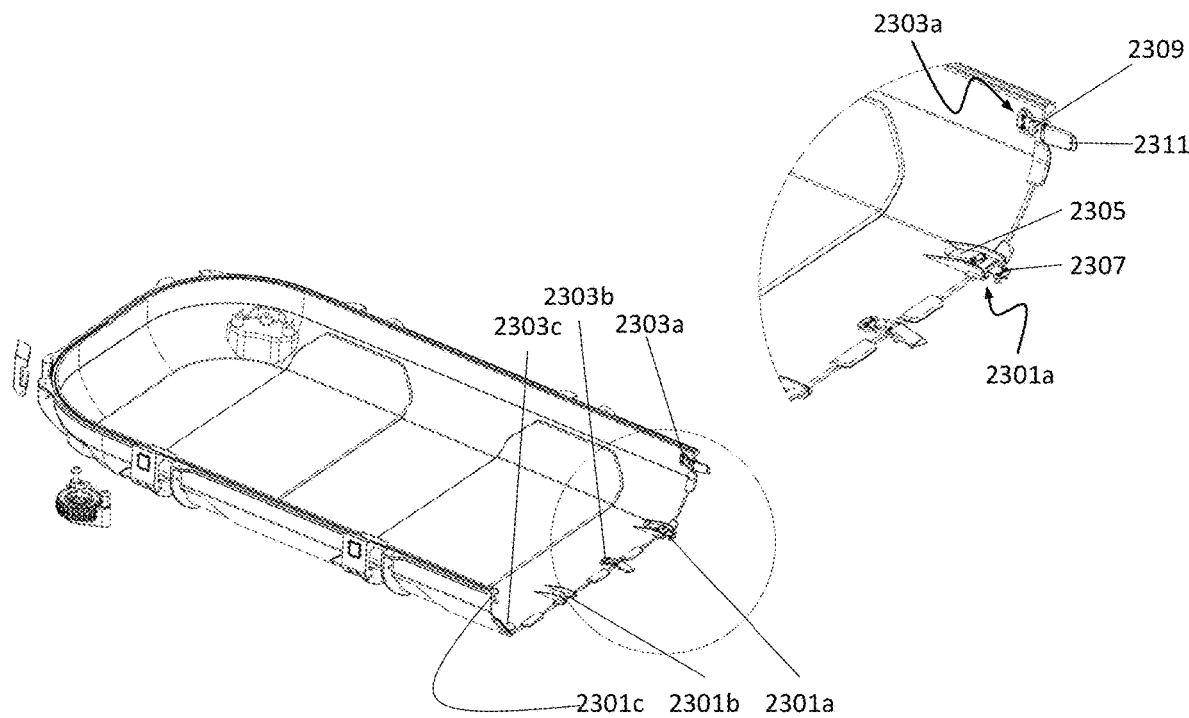
FIG. 23 illustrates a top perspective view of one embodiment of a modular section including a detail view of the modular section.

FIG. 23 illustrates a top perspective view of one embodiment of an end section wherein the section includes three latch positions (2301a, 2301b, 2301c) and three keeper positions (2303a, 2303b, 2303c) on the inside surface of the end section and positioned in an alternating sequence along the edge of the end section. The first latch position 2301a illustrates a latch position with a latch 2305 attached and engaged to an external keeper 2307, while the second latch position 2301b illustrates a latch position without a latch attached. The first keeper position 2303a illustrates a keeper position with a keeper 2309 attached and an external latch 2311 engaged to the keeper 2309. The end section is configured such that a latch position from another segment is operable to engage the keepers (2303a, 2303b, 2303c) and have aligned keepers for latches (2301a, 2301b, 2301c) attached to the end segment. In alternative embodiments, the end section includes any number of latches that will securely connect two sections together. Latches are either throw latches as illustrated or any other form of latch, buckle, or clasp known in the art, including the cam lock latch of the present invention. Latches and keepers are operable to be attached to intermediary platforms in the latch and keeper positions, wherein the intermediary platforms include washers, plates, or other material supplementary to the modular section itself. In the illustrated embodiment, latches are secured through intermediary platforms with screws positioned lengthwise to the modular section and keepers are secured through intermediary platforms with screws positioned widthwise to the modular section.

Figure 24:
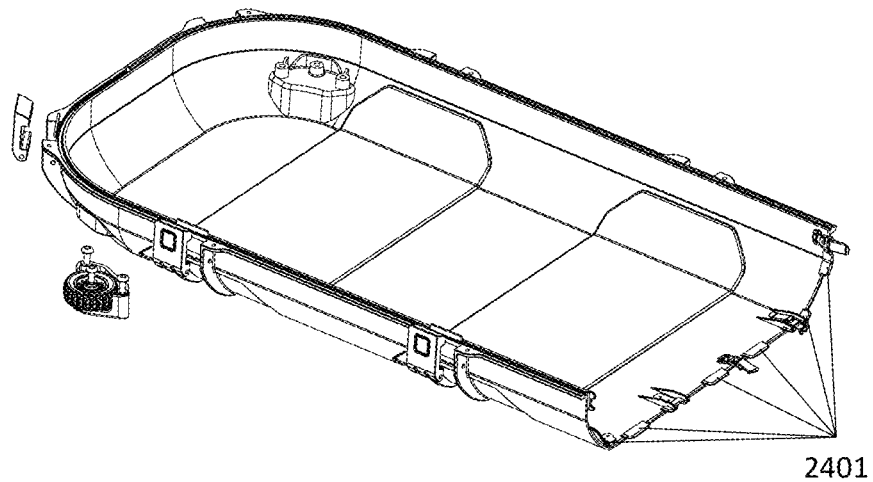
FIG. 24 illustrates a top perspective view of one embodiment of a modular section.

Additionally, FIG. 24 illustrates a top perspective view of a modular section wherein tabs 2401 are symmetrically positioned along the same inside edge of the end section as the latches and provide structural stability for attached modular structures. The tabs 2401 are aligned such that when an identical, second end section is attached to the end section the tabs are complimentarily alternating and symmetrical in order to prevent the end sections from buckling outwards or rotating. In a preferred embodiment, the tabs are approximately 3 inches in length and are positioned at approximately 13 inch to 18 inch intervals from each other. Preferably, there are eight (8) tabs per complimentary end section. Additionally, midsections and end caps are also constructed to have complimentary tabs, wherein the tabs are constructed in a similar manner to provide structure and stability to the case when attached.

Modular sections are connected to each other laterally through the latching and tabbing mechanisms described above. The geometry and construction of the case further allows for stacking multiple sections vertically. When stacked with concave faces towards each other, the sections form a hollow case section. When stacked with one concave face and one convex face towards each other, the aligned geometry allows for compact storage of the modular sections.

Figure 25:
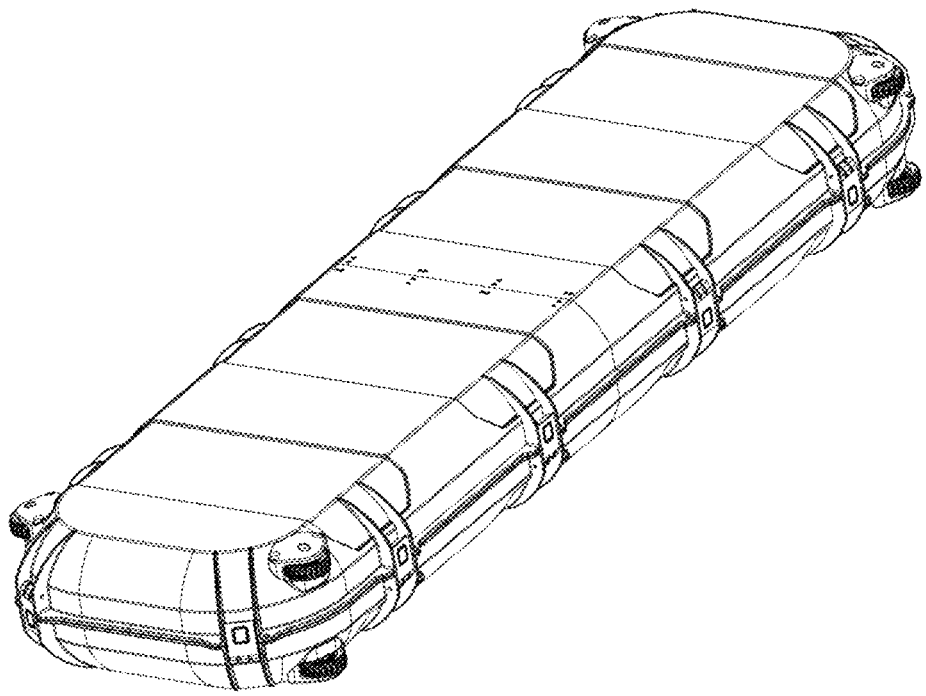
FIG. 25 illustrates a top perspective view of one embodiment of an assembled modular case.

FIG. 25 illustrates a top perspective view of one embodiment of the hollow case.

Figure 26:
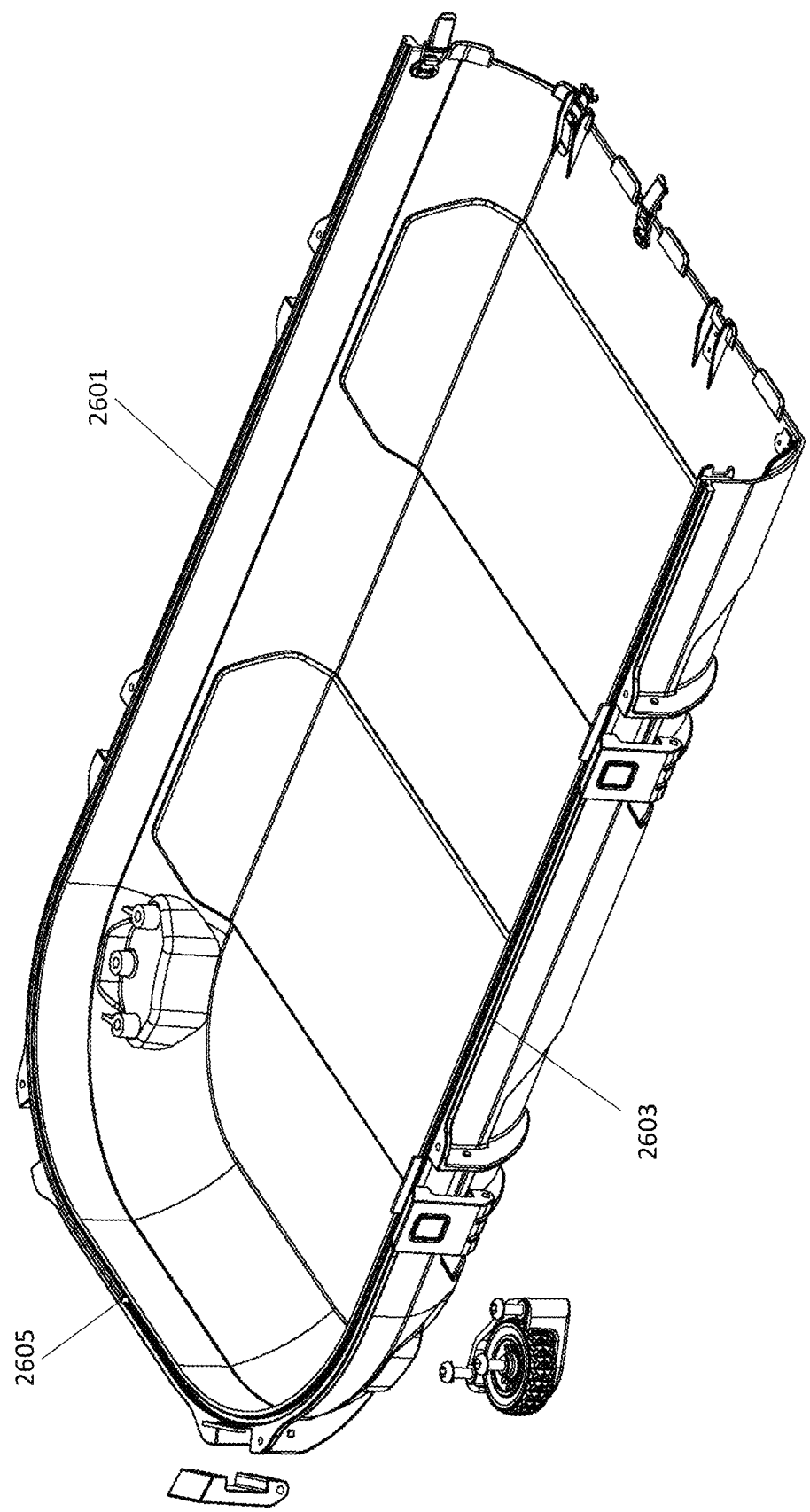
FIG. 26 illustrates a top perspective view of another embodiment of a modular section.

When one section is placed on top of another with the concave faces towards each other, male and female edges of complimentary and substantially identical sections interlock and are in mating contact along the edges. FIG. 26 illustrates a top perspective view of the male and female edges of an end section. In FIG. 26, the male edge 2601 runs along a first half of the section's edge, meets at the middle of the non-latched end 2605 with the female edge 2603, which continues around a second half of the section's edge. With this geometry, a substantially identical second section is thus operable to be positioned in a configuration with its male and female edges securely and matingly contacting the female and male edges of the first section, respectively. The edges extend approximately 0.15 inches to 0.25 inches from the vertical surface of the section, creating an external rib.

Figure 27:
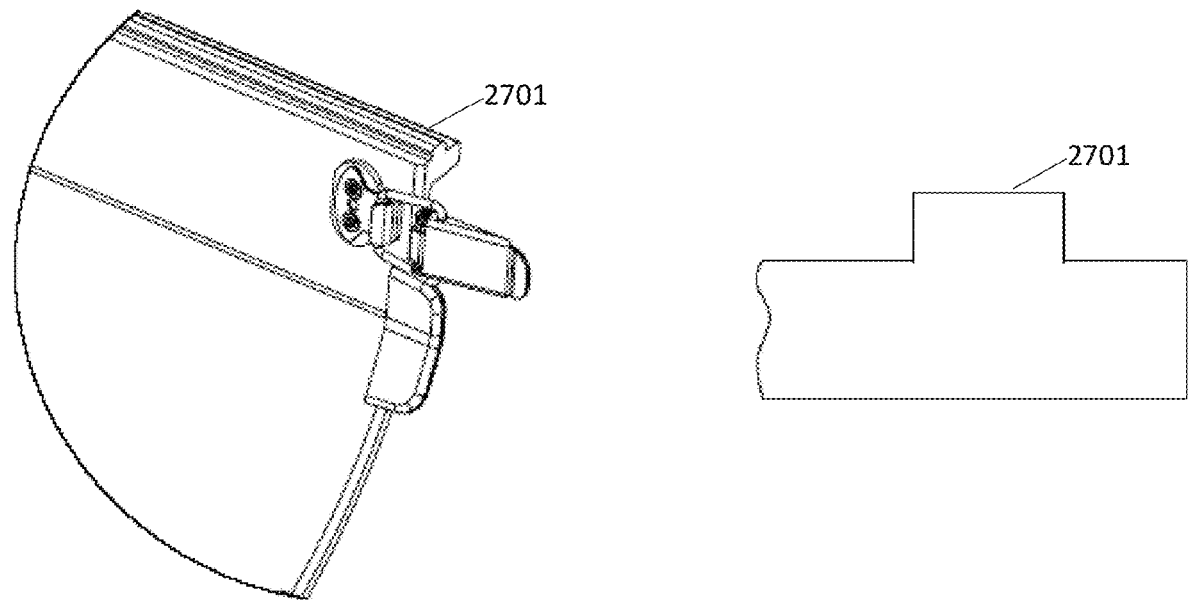
FIG. 27 illustrates a detail view and profile of a male edge of a section embodiment.
Figure 28:
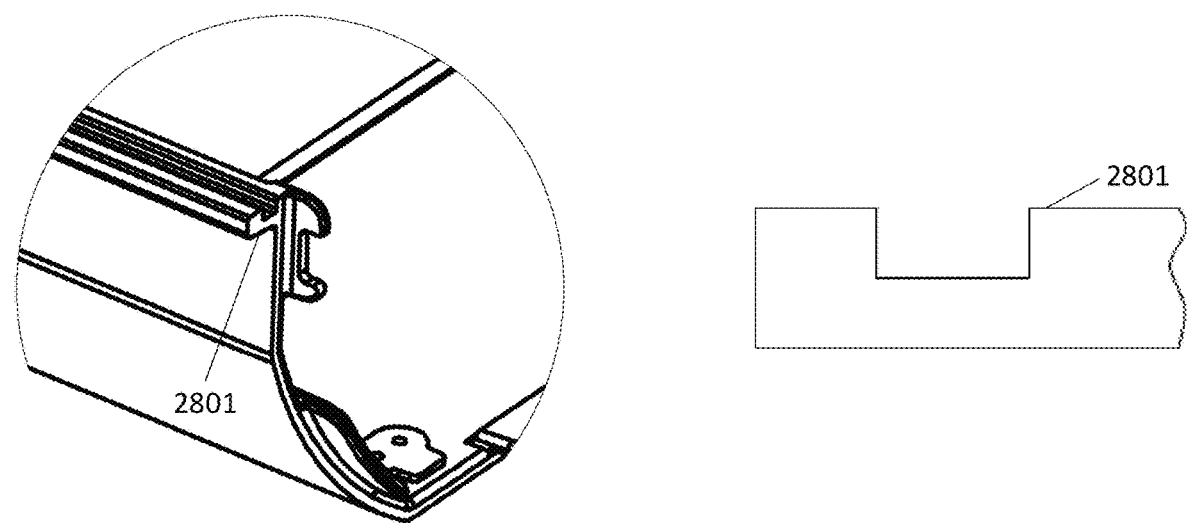
FIG. 28 illustrates a detail view and profile of a male edge of a section embodiment.

FIG. 27 illustrates a detail and profile view of a male edge 2701. FIG. 28 illustrates a detail and profile view of a female edge 2801. FIG. 29 illustrates a detail and profile view of mating contact between the two edges 2901 wherein sections are joined to form the hollow case.

In alternative embodiments, the interlocking occurs through sliding a section on top of another section, through dovetail-shaped tracks, through snap-fit edges, and/or through any other alignment and positioning method known in the art of mechanical design.

Figure 30:
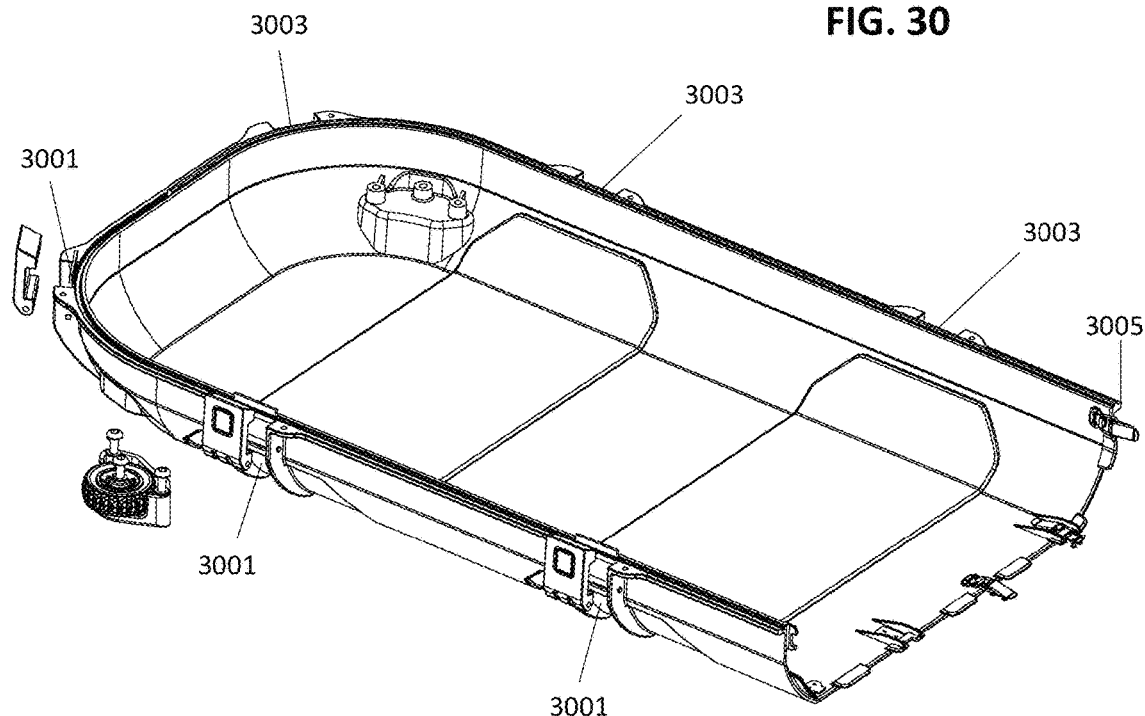
FIG. 30 illustrates a top perspective view of a modular section with exploded latches.
Figure 31:
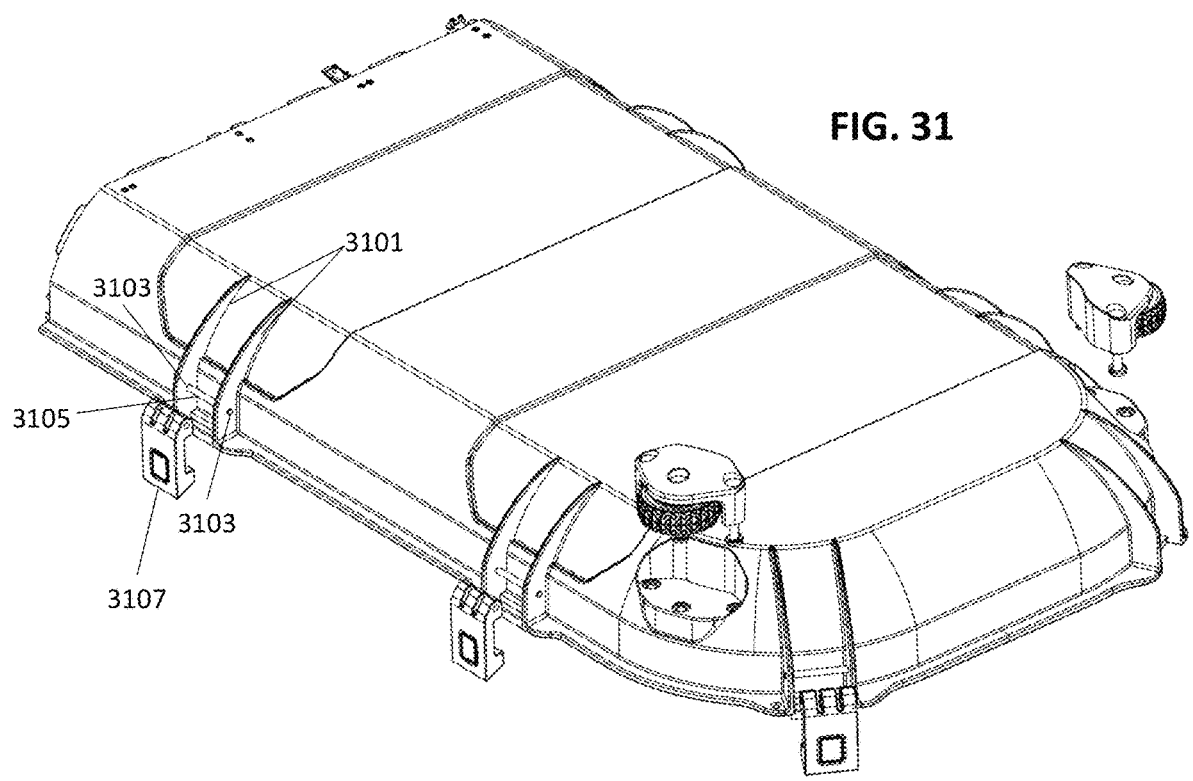
FIG. 31 illustrates a bottom perspective view of a modular section with an exploded view of latches and wheels.

Additionally, throw latches secure the mated edges in the hollow case configuration. FIG. 30 illustrates a top perspective view of a modular section with latch positions 3001 and keeper positions 3003 distributed along the external edge of the convex face of a section. Keepers are preferably formed from lateral ribs 3005 formed from male or female edges of the section. FIG. 31 illustrates a bottom perspective view of a modular section with an exploded view of the latch positions. Dual vertical ribs 3101 on either side of a latch position or a keeper position provide structural stability and protection from accidental disengagement of the latches. Holes 3103 for a latch pin 3105 are placed at a distance from the edge of the section such that a latch 3107 is able to securely engage a keeper on a second modular section. In one embodiment, the distance between the pin and the edge is approximately 1.3 inches. FIG. 32 illustrates a detailed exploded view of a latch position with a latch pin 3105 inserted in the holes 3103. In the illustrated embodiment, throw latches are attached to the section by the pin fed through a hole 3201 in the latch. In a further embodiment, the latch snaps onto the pin. The figure further illustrates the holes for the latch pin placed on the side of the section with female edges, though in further embodiments the hole, pin, and latch are placed on the opposite, male-edge side. Latches are either throw latches as illustrated or any other form of latch, buckle, or clasp known in the art, including the cam lock latch of the present invention. Also illustrated in FIG. 32 is a vertical tab 3203. Vertical tabs are positioned between the vertical ribs of latch positions on sides of a section with female edges. A vertical tab is inserted into a vertical tab slot in a corresponding female latch position of another section. Tab slots are preferably on sides of sections with male edges. In a further embodiment, vertical tabs and tab slots are positioned along the edges and are not limited to a position in line with the latch position.

FIG. 33 illustrates a detail view an assembly of a vertical latch in a latch position.

Figure 34:
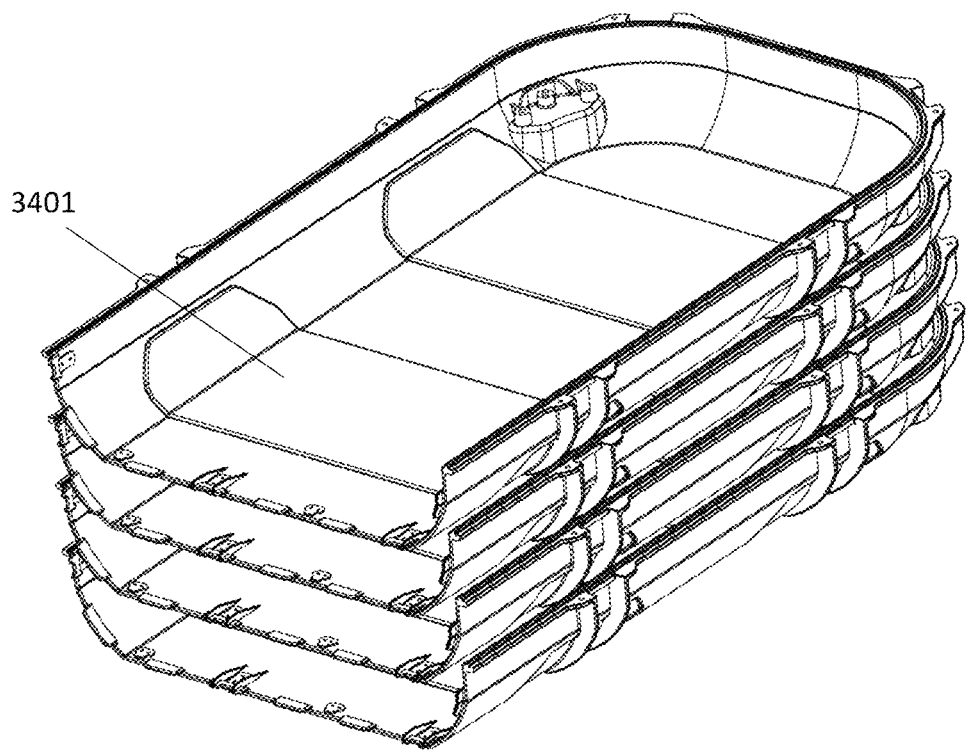
FIG. 34 illustrates a top perspective view of stacked modular end sections according to one embodiment of the present invention.

FIG. 34 illustrates a top perspective view of one embodiment of the stacking capability of the case. In the illustrated embodiment, each section is identically constructed and sufficiently concave such that the sections matingly contact along the internal face of a first section and the external face and ribs of a second surface. Sections include at least one impressed area from the external surface (FIG. 35, 3507) that creates raised area 3401 on the internal surface, which provides anti-slip benefits when stacked as well as increased durability to the section overall. In further embodiments, end cap sections and other modular sections are constructed with complimentary geometry such that the modular sections are operable to be stacked with other modular sections. In yet another embodiment, the modular sections are constructed with rotational symmetry such that the sections are stackable in an alternating, rotating fashion. For example, the sections are stackable with latched ends of the modular sections facing in opposite directions.

Modular sections are further stackable inside a hollow case such that upon stacking the sections into a hollow case, extra end cap sections, midsections, and end sections are enclosed within the hollow case.

Figure 35:
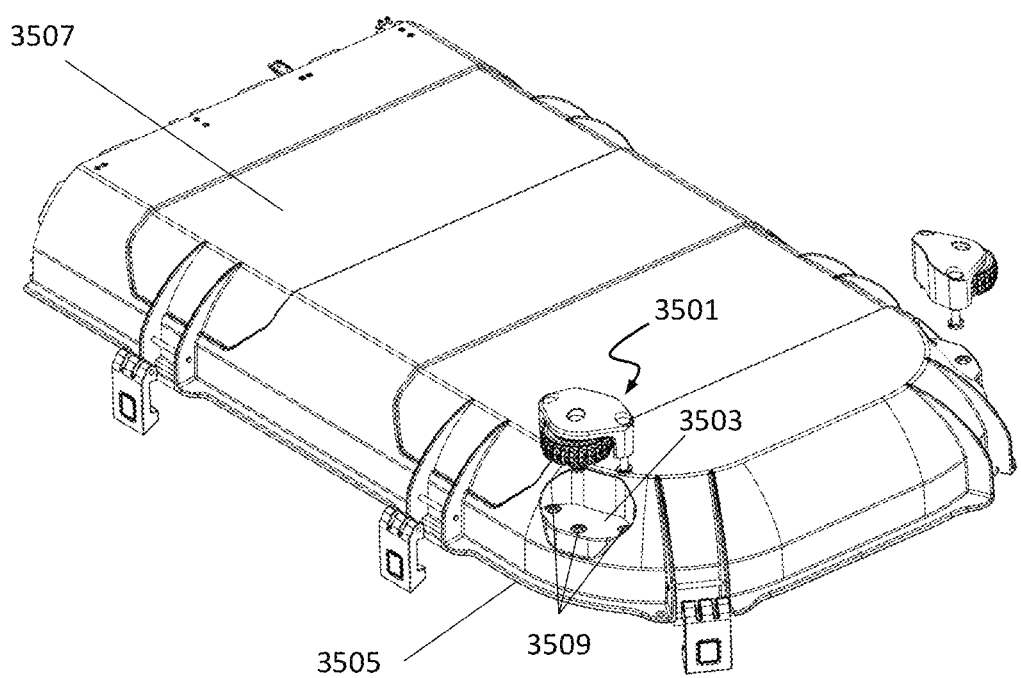
FIG. 35 illustrates a bottom perspective view of the external surface of a modular section with a wheel assembly.
Figure 36:
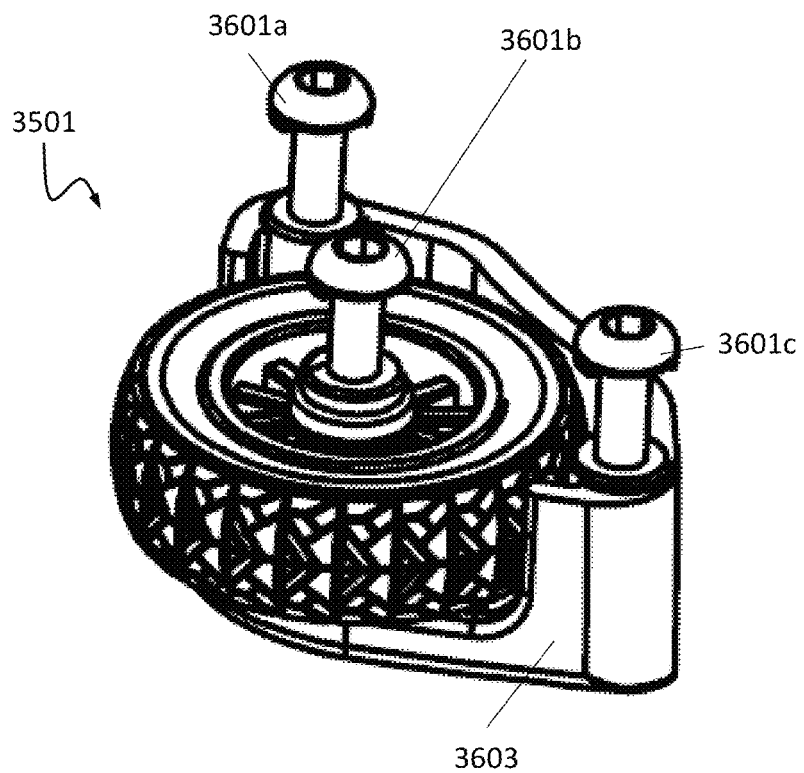
FIG. 36 illustrates a top perspective view of a wheel assembly embodiment.

FIG. 35 illustrates a bottom perspective and exploded view of a modular section with a wheel assembly 3501, wherein the wheel assembly 3501 is constructed to complimentarily sit in a recess 3503 within the corner of the modular section that is substantially parallel to a lateral plane formed by the edges 3505 of the modular section. In one embodiment, the inside plane of the recess is positioned about approximately 45 degrees from the vertical plane of the length of the section towards the vertical plane of the width of the section. A detail top perspective view of the wheel assembly is illustrated in FIG. 36. Three screws (3601a, 3601b, 3601c) secure the wheel assembly 3501 through holes (FIG. 35, 3509) in the recess (FIG. 35, 3503). Screws (3601a, 3601b, 3601c) are fed from the concave side of the section to the convex side, and the wheel assembly 3501 is then attached. As illustrated, a screw 3601b is further operable to function doubly as a wheel axel and a retaining screw. Alternatively, at least one screw secures the wheel assembly through holes in the recess. The illustrated, preferred embodiment allows for quick attachment and removal of the wheel assembly to the modular section. In alternative embodiments, the wheel assembly is attached to the modular section through a retaining push pin, latch, or other hardware mechanism or is constructed as part of the modular section such that the wheel housing 3603 or wheel assembly 3501 is a feature of the modular section itself and not a separate component. Preferably, a modular section includes at least two recesses for wheel assemblies. In a case configured from four modular end sections, the result is eight (8) total wheels for the assembled case. The wheel assemblies are illustrated to be oriented along the lateral plane of the sections, however one skilled in the art will recognize that the wheels are operable to be positioned at any angle relative to the lateral plane of the sections, including being positioned along the vertical plane of the sections. In alternative embodiments, the wheel housing includes swivel wheels such that the wheels are operable to rotate with the direction of case movement. In one embodiment, the wheel assembly is locked into the section using solid fasteners such as C-clips. Three fasteners lock each wheel assembly into the inside of the section in one example. The wheels of the wheel assembly are about 80 mm (3.15 inches) in diameter in one embodiment of the present invention. Additionally, the wheels include tread or other mechanisms of providing traction.

Figure 37:
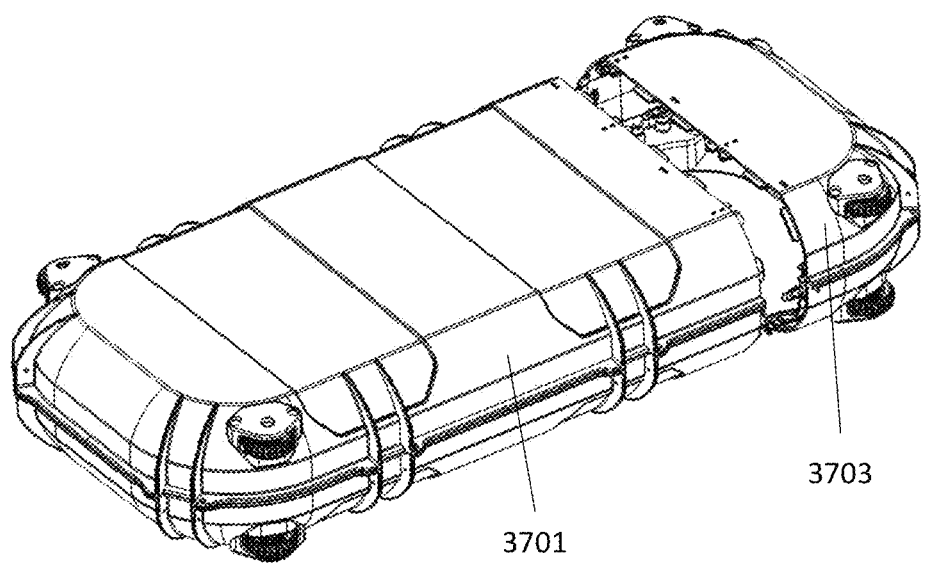
FIG. 37 illustrates a top perspective exploded view of one embodiment of an assembled case including two end sections and two end cap sections.
Figure 38:
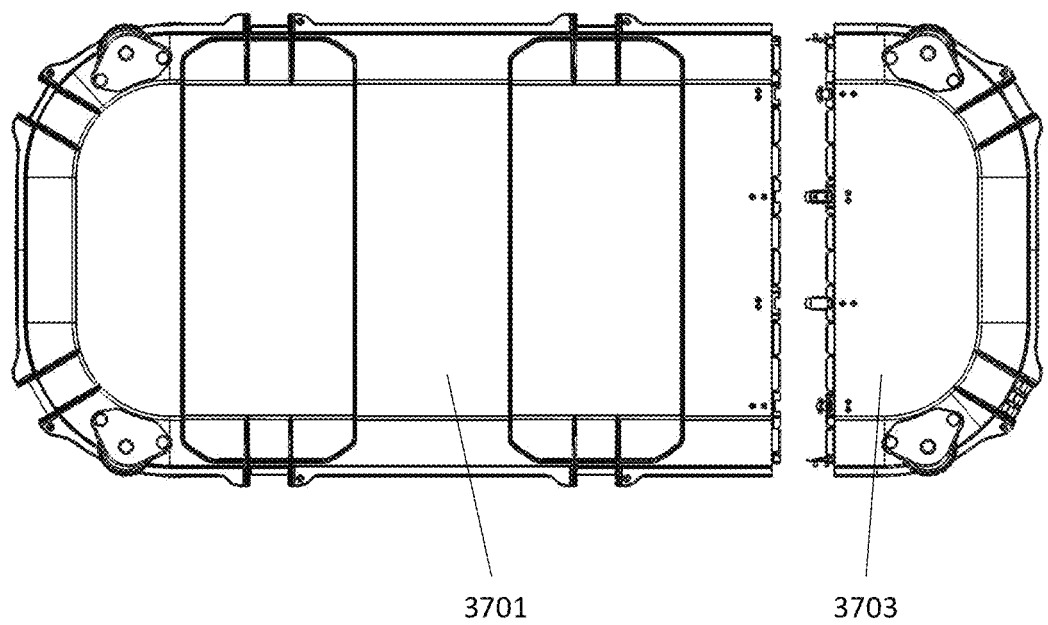
FIG. 38 illustrates a top orthogonal exploded view of one embodiment of an assembled case including two end sections and two end cap sections.

FIG. 37 illustrates a top perspective view of a case with two end sections 3701 and two end cap sections 3703, which are configured to create a miniaturized case. FIG. 38 illustrates a top view of the same case with two end sections 3701 and two end cap sections 3703.

FIG. 39 illustrates a top view of an end section. FIG. 40 illustrates a right side view of the same end section. FIG. 41 illustrates a rear view of the same end section.

Figure 42:
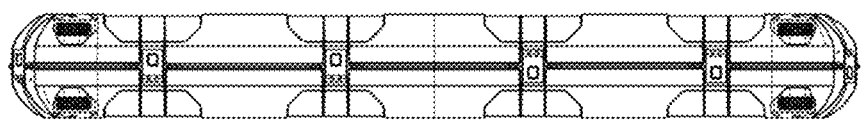
FIG. 42 illustrates a right side orthogonal view of one embodiment of an assembled hollow case with four end sections.
Figure 43:
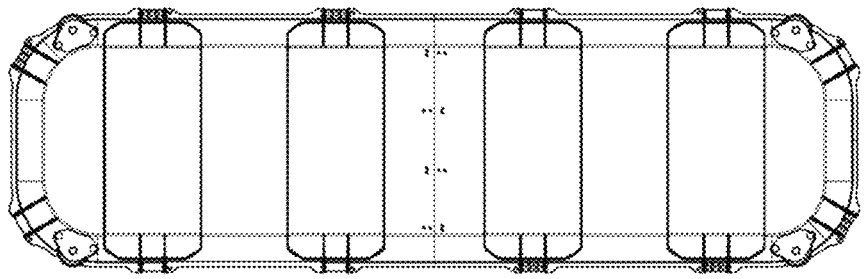
FIG. 43 illustrates a top orthogonal view of one embodiment of an assembled hollow case with four end sections.

FIG. 42 illustrates a right side view of a hollow case configuration with four end sections. FIG. 43 illustrates a top view of the same hollow case configuration with four end sections.

Advantageously, the case is operable to be configured from any number of midsections and combined with multiple sizes of end caps or end sections. For example, a smallest size combines two pairs of end cap sections (a pair including corresponding top and bottom sections) to form a pod-like case. A larger example includes a configuration of one pair of end sections, two pairs of midsections, and one pair of end caps to form a case length four sections long. Notably, any number of sections are operable to be combined to form a case as short or as long as desired. This modular case design provides significant advantages over prior art, as prior art case designs do not allow for the customizability and adaptability of the present invention. For example, in one embodiment, transporting ski poles requires an end section pair, a midsection pair, and an end cap pair to meet the length of the poles. If skis are added to the package with the poles, the case is extended to a configuration of an end section pair, two midsection pairs, and an end section pair. Thus, the length of the case is adaptable to any length of items being transported.

In another embodiment, a hollow, modular case transporting a surf board includes one pair of end sections, two pairs of midsections, and one pair of end caps for a total of eight sections. Following transporting the surfboard to a beach, the case is operable to breakdown, and all eight sections are compactly stackable for storage. When transporting the surfboard back, the eight sections are reconfigured to form a hollow case and repackage the surfboard.

The described lengths of each of the sections are specific embodiments of the end section, midsection, and end caps and are provided for functionality illustration purposes only. One skilled in the art will recognize that the dimensions are modifiable to any necessary length, width, or depth. For example, in one embodiment, an end cap section is operable to be substantially shorter than illustrated and extend only approximately two inches beyond the lateral tabs. In another embodiment, an end section is operable to be approximately four feet in length and a concavity of approximately six inches.

The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A modular protective case for a surfboard comprising:
a housing including a rigid, impact-resistant material, wherein the housing is composed of at least four sections;
wherein the modular protective case is configured to hold the surfboard;
wherein the housing includes a first half and a second half;
wherein the first half of the housing includes at least two sections of the at least four sections;
wherein the at least two sections are laterally attached to each other;
wherein the second half of the housing includes at least two additional sections of the at least four sections;
wherein the at least two additional sections are laterally attached to each other;
wherein the first half of the housing is attached to the second half of the housing;
wherein at least one of the at least four sections is constructed such that a convex surface of the at least one of the at least four sections is operable to nest within a concave surface of another one of the at least four sections such that the at least four sections are stackable when disassembled; and
wherein each of the at least four sections include at least two wheel assemblies, and wherein at least one attachment point comprises a wheel axle.

2. The case of claim 1, further comprising vertical ribs which assist in distributing stress forces.

3. The case of claim 1, wherein each of the at least four sections include male and female edges such that when a first section is placed on top of a second section with concave faces opposing each other, the male and female edges of the first section interlock with the female and male edges of the second section.

4. The case of claim 1, wherein each of the at least four sections includes at least one impressed area on the convex surface and at least one raised area on the concave surface, and wherein the at least one raised area provides anti-slip benefits.

5. The case of claim 1, wherein each of the at least four sections include at least two keepers positioned in alternating sequence with at least two latches along an interface edge.

6. The case of claim 1, wherein each of the at least four sections is operable to interlock with an attached lateral section, thereby providing support and structure to the case when assembled.

7. The case of claim 1, wherein each of the at least four sections include tabs, wherein each tab interlocks with at least one tab of an attached lateral section.

8. The case of claim 1, wherein the at least four sections are constructed with rotational symmetry such that the at least four sections are operable to be stacked in an alternating and rotating pattern.

9. A modular protective case for a surfboard comprising:
a housing including a rigid, impact-resistant material, wherein the housing is composed of at least four sections;
wherein the modular protective case is configured to hold the surfboard;
wherein the housing includes a first half and a second half;
wherein the first half of the housing includes at least two sections of the at least four sections;
wherein the at least two sections are laterally attached to each other;
wherein the second half of the housing includes at least two additional sections of the at least four sections;
wherein the at least two additional sections are laterally attached to each other;
wherein the first half of the housing is attached to the second half of the housing;
wherein at least one of the at least four sections is constructed such that a convex surface of the at least one of the at least four sections is operable to nest within a concave surface of another one of the at least four sections such that the at least four sections are stackable when disassembled; and
wherein each of the at least four sections includes at least one impressed area on the convex surface and at least one raised area on the concave surface.

10. The case of claim 9, wherein the at least one raised area provides anti-slip benefits.

11. The case of claim 9, wherein the at least four sections are constructed with rotational symmetry such that the at least four sections are operable to be stacked in an alternating and rotating pattern.

12. The case of claim 9, further comprising vertical ribs which assist in distributing stress forces.

13. The case of claim 9, wherein each of the at least four sections include male and female edges such that when a first section is placed on top of a second section with concave faces opposing each other, the male and female edges of the first section interlock with the female and male edges of the second section.

14. A modular protective case for a surfboard comprising:
a housing including a rigid, impact-resistant material, wherein the housing is composed of six sections;
wherein the modular protective case is configured to hold the surfboard;
wherein the housing includes a first half and a second half;
wherein the first half of the housing includes two end sections and one midsection of the six sections;
wherein the two end sections are each laterally attached to the one midsection;
wherein the second half of the housing includes two additional end sections and one additional midsection of the six sections;
wherein the two additional end sections are laterally attached to the one additional midsection;
wherein the first half of the housing is attached to the second half of the housing;
wherein each of the six sections interlock with an attached lateral section, thereby providing support and structure to the case when assembled;
wherein the six sections each have an internal face and an external face;
wherein the internal face of each of the six sections is concave, and wherein the external face of each of the six sections is convex, such that the external face of a first section of the six sections nests within the internal face of a second section of the six sections such that the six sections are stackable upon being disassembled; and
wherein each of the at least six sections includes at least one impressed area on the convex surface and at least one raised area on the concave surface.

15. The case of claim 14, wherein the at least one raised area provides anti-slip benefits.

16. The case of claim 14, wherein each of the at least six sections include male and female edges such that when a first section is placed on top of a second section with concave faces opposing each other, the male and female edges of the first section interlock with the female and male edges of the second section.

17. The case of claim 14, wherein the two additional end sections are substantially identical to the two end sections and the one additional midsection is substantially identical to the one midsection.

18. The case of claim 14, wherein each of the two end sections and the two additional end sections include at least two wheel assemblies, wherein at least one attachment point comprises a wheel axle, and wherein the wheel axle is perpendicular to a plane dividing the first half of the housing from the second half of the housing.

19. The case of claim 14, wherein the six sections are constructed with rotational symmetry such that the six sections are operable to be stacked in an alternating and rotating pattern.

* * * * *